(12) United States Patent
Ebuchi et al.

(10) Patent No.: US 10,030,724 B2
(45) Date of Patent: Jul. 24, 2018

(54) ENGAGEMENT DEVICE

(71) Applicants: Hiroaki Ebuchi, Hadano (JP); Yuji Iwase, Mishima (JP); Hidekazu Nagai, Susono (JP); Hiroto Hashimoto, Susono (JP)

(72) Inventors: Hiroaki Ebuchi, Hadano (JP); Yuji Iwase, Mishima (JP); Hidekazu Nagai, Susono (JP); Hiroto Hashimoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 409 days.

(21) Appl. No.: 14/762,380

(22) PCT Filed: Jan. 22, 2013

(86) PCT No.: PCT/JP2013/051212
§ 371 (c)(1),
(2) Date: Jul. 21, 2015

(87) PCT Pub. No.: WO2014/115248
PCT Pub. Date: Jul. 31, 2014

(65) Prior Publication Data
US 2015/0362027 A1 Dec. 17, 2015

(51) Int. Cl.
*F16D 63/00* (2006.01)
*F16D 11/10* (2006.01)
(Continued)

(52) U.S. Cl.
CPC ............ *F16D 63/006* (2013.01); *F16D 11/10* (2013.01); *F16D 48/06* (2013.01); *B60K 6/38* (2013.01);
(Continued)

(58) Field of Classification Search
CPC .................................. F16C 13/58; F16D 13/58
See application file for complete search history.

(56) References Cited

U.S. PATENT DOCUMENTS

| 1,907,619 A | 5/1933 | Soden-Fraunhofen |
| 5,997,435 A | 12/1999 | Back |
| 2008/0262685 A1 | 10/2008 | Asplund et al. |

FOREIGN PATENT DOCUMENTS

| JP | 2000-249164 A | 9/2000 |
| JP | 3122943 B2 | 1/2001 |

(Continued)

OTHER PUBLICATIONS

Machine language translation of JP2009-293675.*
International Search Report dated Apr. 23, 2013 in PCT/JP13/051212 Filed Jan. 22, 2013.

*Primary Examiner* — Mark A Manley
(74) *Attorney, Agent, or Firm* — Oblon, McClelland, Maier & Neustadt, L.L.P.

(57) ABSTRACT

An engagement device includes: a first member including a plurality of engaged teeth; a second member arranged coaxially with the first member, the second member including a plurality of engaging teeth; a rotation unit configured to relatively rotate the first member and the second member about an axis; a movement unit configured to relatively move the first member and the second member in an axial direction; and a control unit configured to control operations of the rotation unit and the movement unit, and the engaged teeth are formed on the first member at a side opposing the second member along a circumferential direction around the axis, and the engaging teeth are formed on the second member at a side opposing the first member along the circumferential direction around the axis.

7 Claims, 13 Drawing Sheets

(51) Int. Cl.
*B60K 6/38* (2007.10)
*F16D 48/06* (2006.01)
*F16D 11/00* (2006.01)
(52) U.S. Cl.
CPC .................. *F16D 2011/008* (2013.01); *F16D 2500/30415* (2013.01); *F16D 2500/50287* (2013.01); *F16D 2500/50607* (2013.01); *F16D 2500/7041* (2013.01); *F16D 2500/70424* (2013.01)

(56) References Cited

FOREIGN PATENT DOCUMENTS

| | | | |
|---|---|---|---|
| JP | 2009-293675 | * | 12/2009 |
| JP | 2010-269668 | A | 12/2010 |
| JP | 2012-21499 | A | 2/2012 |

* cited by examiner

ENGAGEMENT DEVICE

FIELD

The present invention relates to an engagement device.

BACKGROUND

Conventionally, there has been known an engagement device which is provided with a first member having engaged teeth arranged around a rotation shaft and a second member having engaging teeth and engages the engaging teeth with the engaged teeth to engage both the members. As such an engagement device, for example, Patent Literature 1 discloses a meshing device which has inclined surfaces provided in a tooth part of a drive gear and a tooth part of a driven gear, each of the inclined surfaces being located between an end surface opposing the other gear and a tooth surface. The inclined surface of the drive gear is formed on the rear side with respect to the rotation direction of the drive gear. On the other hand, the inclined surface of the driven gear is formed on the front side with respect to the rotation direction. In the meshing device, the inclined surface of the driven gear is first brought into contact with the inclined surface of the drive gear and moved toward the drive gear along the inclined surface of the drive gear during an engagement operation. This enables the driven gear to reliably mesh with the drive gear.

CITATION LIST

Patent Literature

Patent Literature 1: Japanese Laid-open Patent Publication No. 2000-249164

SUMMARY

Technical Problem

However, in the conventional engagement device as disclosed in Patent Literature 1, the inclined surfaces of the drive gear and the driven gear may not make contact with each other and meshing surfaces may make direct contact with each other. In such a situation, the contact area between the meshing surfaces becomes small, which may cause insufficient meshing. Further, when the contact area between the meshing surfaces is small, contact pressure is increased to increase impact received by the tooth part during the meshing. Thus, the durability of the engagement device may be disadvantageously deteriorated.

The present invention has been made in view of the above circumstances, and an object thereof is to provide an engagement device capable of reliably performing the engagement and improving the durability.

Solution to Problem

To solve the above-described problem, an engagement device according to the present invention includes: a first member including a plurality of engaged teeth; a second member arranged coaxially with the first member, the second member including a plurality of engaging teeth; a rotation unit configured to relatively rotate the first member and the second member about an axis; a movement unit configured to relatively move the first member and the second member in an axial direction; and a control unit configured to control operations of the rotation unit and the movement unit. The engaged teeth are formed on the first member at a side opposing the second member along a circumferential direction around the axis, and the engaging teeth are formed on the second member at a side opposing the first member along the circumferential direction around the axis, each of the engaged teeth includes a pair of tooth surfaces opposing each other in the circumferential direction, and each of the engaging teeth includes a pair of tooth surfaces opposing each other in the circumferential direction, when viewed from the second member, out of the pair of tooth surfaces of each of the engaged teeth, a front edge end of a first tooth surface is arranged on a back side in the axial direction with respect to a front edge end of a second tooth surface, and, when viewed from the first member, out of the pair of tooth surfaces of each of the engaging teeth, a front edge end of a first tooth surface is arranged on a back side in the axial direction with respect to a front edge end of a second tooth surface, the engaged teeth and the engaging teeth are formed to have a small width in the circumferential direction on a side opposing each other in the axial direction, the first tooth surfaces of the engaged teeth and the first tooth surfaces of the engaging teeth are arranged to face and approach each other at a time the first member rotates in a negative rotation direction relative to the second member, the second tooth surfaces of the engaged teeth and the second tooth surfaces of the engaging teeth are arranged to face and approach each other at a time the first member rotates in a positive rotation direction relative to the second member, and at a time the first member and the second member are engaged with each other, the control unit is configured to control the movement unit to relatively move the first member and the second member in a direction approaching each other while the first member is rotating in the negative rotation direction relative to the second member, and further control the rotation unit to change a relative rotation speed of the first member relative to the second member from a negative rotation speed to zero or more after a predetermined movement condition for relative movement between the first member and the second member is satisfied.

Moreover, in the above-described engagement device, it is preferable that the control unit is configured to determine that the movement condition is satisfied at a time is the control unit has determined that the first member and the second member can approach each other by a predetermined distance.

Moreover, in the above-described engagement device, it is preferable that the control unit is configured to control the movement unit to further relatively move the first member and the second member in the direction approaching each other while changing the relative rotation speed from a negative rotation speed to zero or more.

Moreover, in the above-described engagement device, it is preferable that a biasing unit is provided in at least either the first member or the second member, the biasing unit being biased in response to contact between the first member and the second member in the axial direction.

Moreover, in the above-described engagement device, it is preferable that each of the engaged teeth of the first member includes an end surface arranged to face the second member at a position closest to the second member in the axial direction and an engaged tooth side connection surface connecting the end surface to the first tooth surface of each of the engaged teeth, and each of the engaging teeth of the second member includes an end surface arranged to face the first member at a position closest to the first member in the axial direction and an engaging tooth side connection surface connecting the end surface to the first tooth surface of each of the engaging teeth.

Moreover, in the above-described engagement device, it is preferable that the engaged tooth side connection surface and the engaging tooth side connection surface are surfaces having a tapered shape.

Moreover, in the above-described engagement device, it is preferable that the control unit is configured to control the rotation unit to reduce the relative rotation speed at a time the relative rotation speed becomes a predetermined value in the positive rotation direction or more after the relative rotation speed is changed from a negative rotation speed to zero or more.

Moreover, in the above-described engagement device, it is preferable that the first member is rotatably supported about a rotation shaft, the second member is movably supported along the axial direction, the rotation unit rotates the first member about the axis, the movement unit moves the second member in the axial direction, and at a time the first member and the second member are engaged with each other, the control unit is configured to control the movement unit to move the second member in a direction approaching the first member while the first member is rotating in the negative rotation direction and further controls the rotation unit to change the rotation speed of the first member from a negative rotation speed to zero or more after the movement condition is satisfied.

Advantageous Effects of Invention

The engagement device according to the present invention achieves effects of reliably performing the engagement and improving the durability.

DESCRIPTION OF EMBODIMENTS

Hereinbelow, embodiments of an engagement device according to the present invention will be described on the basis of the drawings. In the following drawing, identical or equivalent parts will be designated by identical reference signs, and description thereof will not be repeated.

First Embodiment

Figure 1:
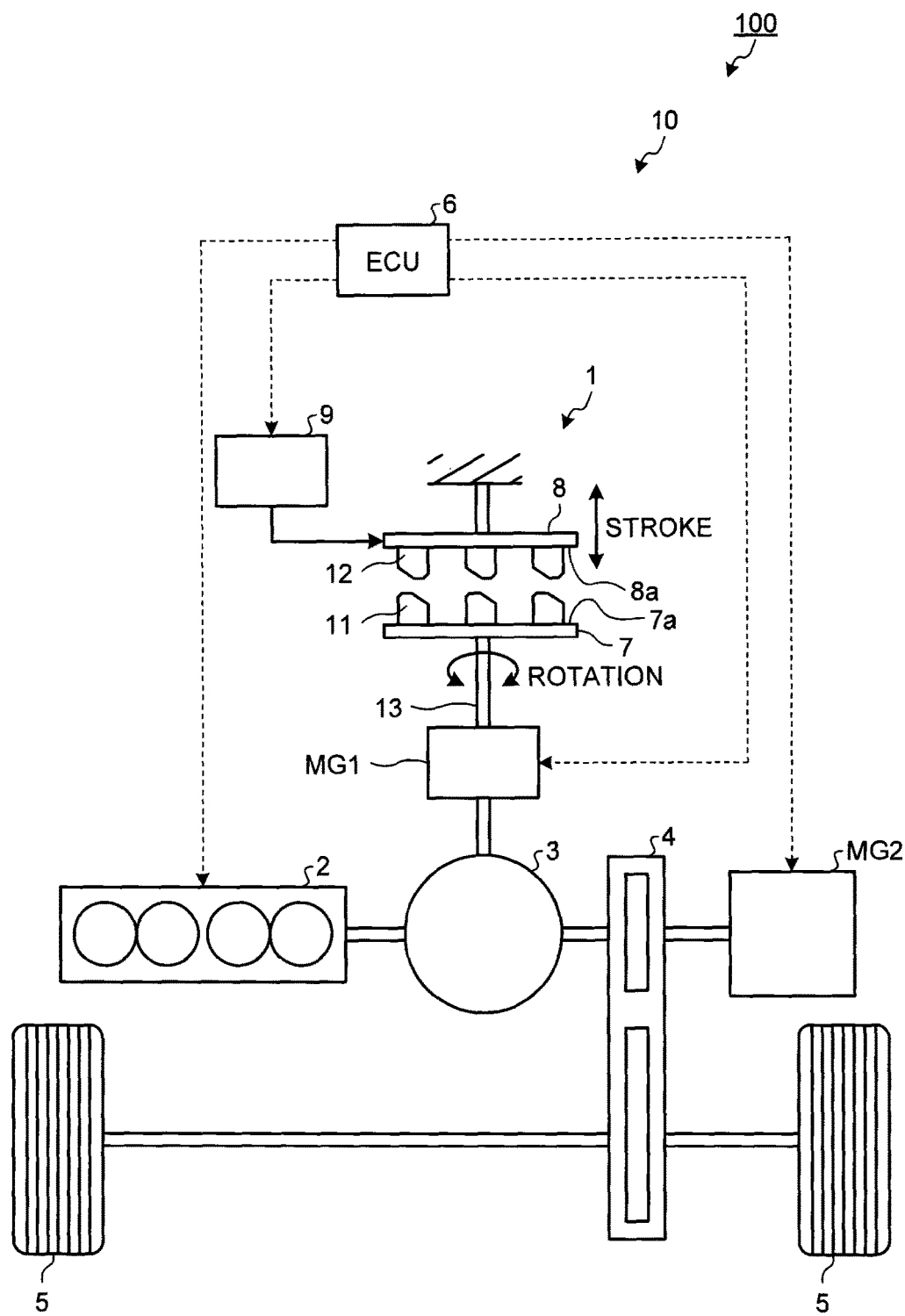
FIG. 1 is a diagram illustrating a schematic configuration of a hybrid vehicle driving device to which an engagement device according to a first embodiment of the present invention is applied.
Figure 2:
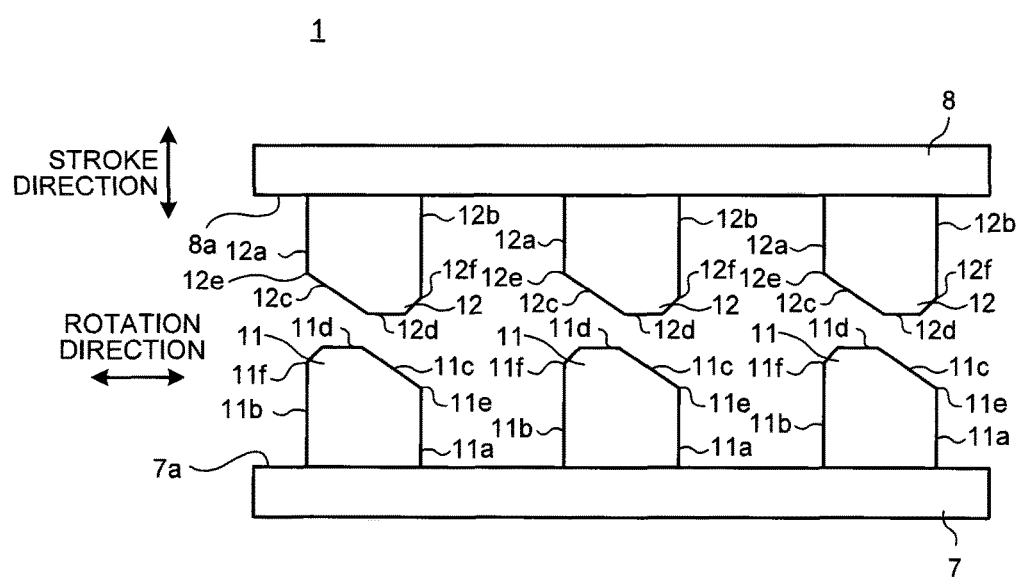
FIG. 2 is a schematic view illustrating an enlarged principal part of the engagement device in FIG. 1.

A first embodiment will be described with reference to FIGS. 1 to 8. First, the configuration of an engagement device 1 according to the first embodiment will be described with reference to FIGS. 1 and 2. FIG. 1 is a diagram illustrating a schematic configuration of a hybrid vehicle driving device to which the engagement device according to the first embodiment of the present invention is applied. FIG. 2 is a schematic view illustrating an enlarged principal part of the engagement device in FIG. 1

As illustrated in FIG. 1, a hybrid vehicle 100 is provided with, as driving sources, an engine 2, and a first motor generator MG1 and a second motor generator MG2 both of which are electric motors capable of generating power to drive driving wheels 5 to rotate for propulsion. The engagement device 1 of the present embodiment is, for example, incorporated in a hybrid vehicle driving device 10 for transmitting motive power from these driving sources to the driving wheels 5. The hybrid vehicle driving device 10 is provided with the engine 2, the first motor generator MG1, the second motor generator MG2, a power transfer mechanism 3, a speed reduction mechanism 4, the driving wheels 5, and an electronic control unit (ECU) 6.

The engine 2 is an internal-combustion engine which outputs motive power by combusting hydrocarbon fuel such as gasoline and light oil. In the engine 2, operation control such as fuel injection control, ignition control, and intake air amount adjusting control is performed by the ECU 6 to which signals are input from various sensors which detect an operating state of the engine 2.

The first motor generator MG1 and the second motor generator MG2 are known alternating current synchronous (ACS) generator motors having both a function as an electric motor which outputs motor torque by electric power supplied thereto (motoring function) and a function as a generator which converts mechanical motive power input thereto into electric power (regenerating function). The first motor generator MG1 is mainly used as a generator. On the other hand, the second motor generator MG2 is mainly used as an electric motor. The first motor generator MG1 and the second motor generator MG2 perform transfer of electric power with a battery through an inverter (not illustrated). Motoring control as an electric motor or regenerative control as a generator of the first motor generator MG1 and the second motor generator MG2 is controlled by the ECU 6.

The engine 2 and the first motor generator MG1 are coupled to a pair of driving wheels 5 through the power transfer mechanism 3 and the speed reduction mechanism 4. The second motor generator MG2 is coupled to the pair of driving wheels 5 through the speed reduction mechanism 4. The power transfer mechanism 3 divides an engine torque output from the engine 2 to the first motor generator MG1 and the driving wheels 5. The power transfer mechanism 3 includes, for example, a planetary gear unit.

The engine torque output from the engine 2 or the motor torque output from the second motor generator MG2 is transmitted to the pair of driving wheels 5 through the power transfer mechanism 3 and the speed reduction mechanism 4. The first motor generator MG1 regenerates electric power by the engine torque divided and supplied by the power transfer mechanism 3 when functioning as a generator. The power transfer mechanism 3 is used as a continuously variable transmission by allowing the first motor generator MG1 to function as a generator and regeneratively controls the first motor generator MG1. That is, output from the engine 2 is speed-changed by the power transfer mechanism 3 and then transmitted to the driving wheels 5. Performing drive control on the second motor generator MG2 or rotation speed control on the first motor generator MG1 or the second motor generator MG2 enables the engine speed of the engine 2 or output to the driving wheels 5 to be controlled.

The engagement device 1 according to the present invention is incorporated in the above hybrid vehicle driving device 10. As illustrated in FIG. 1, the engagement device 1 is coupled to the first motor generator MG1. The engagement device 1 is capable of restricting the rotation of the first motor generator MG1 and used as a MG1 lock mechanism which mechanically locks the rotation of the first motor generator MG1.

In the present embodiment, when it is necessary to control the rotation speed of the first motor generator MG1 to zero during the execution of the engine speed control or the output control to the driving wheels 5 performed by the power transfer mechanism 3, the engagement device 1 mechanically locks the rotation of the first motor generator MG1. This eliminates the need for electrically controlling the rotation speed of the first motor generator MG1. Thus, power supply to the first motor generator MG1 is not required, which enables fuel efficiency to be improved. When the engagement device 1 mechanically locks the rotation of the first motor generator MG1, the power transfer mechanism 3 does not function as a continuously variable transmission, but functions as a fixed stage transmission.

The engagement device 1 is provided with a piece 7 (first member), a sleeve 8 (second member), an actuator 9 (movement unit), the first motor generator MG1 (rotation unit), and the ECU 6 (control unit).

The piece 7 is coupled to a rotation shaft 13 of the first motor generator MG1 and placed rotatably about the rotation shaft 13 in conjunction with the rotation shaft 13. The piece 7 is, for example, a disc member. The piece 7 is connected to the rotation shaft 13 on substantially the center of the disc and configured to rotate about the rotation shaft 13 by driving the first motor generator MG1. FIGS. 1 and 2 illustrate the movement direction of the piece 7 as "rotation direction". The piece 7 is restricted from moving in the radial direction of the rotation shaft 13.

The sleeve 8 is a disc member similar to the piece 7 and arranged coaxially with the piece 7 to face the piece 7. The sleeve 8 is arranged movably in a direction approaching the piece 7 (hereinbelow, also referred to as "engaging direction" or "approaching direction") or a direction separating from the piece 7 (hereinbelow, also referred to as "releasing direction") along an axial direction of the rotation shaft 13. In FIGS. 1 and 2, the movement directions (the engaging direction and the releasing direction) of the sleeve 8 are collectively indicated as "stroke direction". The sleeve 8 is fixed to, for example, a case so that movement in a direction other than the stroke direction is restricted.

The actuator 9 is capable of applying a driving force in the stroke direction to the sleeve 8 in response to a control command from the ECU 6. The sleeve 8 is movable in the stroke direction by application of a thrust force by the actuator 9 (hereinbelow, also referred to as "stroke operation"). The actuator 9 has a so-called a ratchet function for idling by receiving a reaction force. The actuator 9 is capable of maintaining or backing the position in the stroke direction of the sleeve 8 by the ratchet function in a condition in which the sleeve 8 cannot move in the engaging direction by receiving a reaction force, for example, when a dog tooth 12 of the sleeve 8 collides with a dog tooth 11 of the piece 7 during the stroke operation of the sleeve 8.

The relative positional relationship in the approaching direction from the sleeve 8 to the piece 7 can be changed by driving the actuator 9 in response to a control command from the ECU 6 to move the sleeve 8 in the stroke direction. Further, the relative positional relationship between the piece 7 and the sleeve 8 in the rotation direction around the rotation shaft 13 can be changed by driving the first motor generator MG1 in response to a control command from the ECU 6 to rotate the piece 7.

The piece 7 and the sleeve 8 are coaxially arranged to face each other, that is, arranged in such a manner that opposing surfaces 7a and 8a each of which is one surface of each disc face each other. A plurality of dog teeth 11 (engaged teeth) are disposed in a circular shape on the opposing surface 7a of the piece 7 along the circumferential direction at a predetermined position in the radial direction from the center (rotation center) of the opposing surface 7a. Each of the dog teeth 11 projects from the opposing surface 7a toward the sleeve 8 along the axial direction of the rotation shaft 13 (the direction in which the sleeve 8 and the piece 7 approach each other). Each of the dog teeth 11 has a pair of tooth surfaces 11a and 11b. The tooth surfaces 11a and 11b of the dog teeth 11 extend along the approaching direction and face each other in the circumferential direction (rotation direction). In FIG. 2, tooth surfaces on the right side in the drawing are illustrated as the tooth surfaces 11a (first tooth surfaces) and tooth surfaces on the left side are illustrated as the tooth surfaces 11b (second tooth surfaces).

Similarly, a plurality of dog teeth 12 (engaging teeth) are disposed in a circular shape on the opposing surface 8a of the sleeve 8 along the circumferential direction at a predetermined position in the radial direction from the center of the opposing surface 8a. Each of the dog teeth 12 projects from the opposing surface 8a toward the piece 7 along the axial direction of the rotation shaft 13 (the direction in which the sleeve 8 and the piece 7 approach each other). Each of the dog teeth 12 has a pair of tooth surfaces 12a and 12b. The tooth surfaces 12a and 12b of the dog teeth 12 extend along the approaching direction and face each other in the circumferential direction. In FIG. 2, tooth surfaces on the left side in the drawing are illustrated as the tooth surfaces 12a (first tooth surfaces) and tooth surfaces on the right side are illustrated as the tooth surfaces 12b (second tooth surfaces). That is, the tooth surfaces 12a of the dog teeth 12 of the sleeve 8 are located on the opposite side in the rotation direction to the tooth surfaces 11a of the dog teeth 11 of the piece 7. The dog teeth 12 of the sleeve 8 are arranged on the opposing surface 8a in such a manner that the dog teeth 12 can enter spaces between the dog teeth 11 of the piece 7 when the sleeve 8 approaches the piece 7.

The tooth surfaces 11a of the dog teeth 11 of the piece 7 and the tooth surfaces 12a of the dog teeth 12 of the sleeve 8 are arranged to face and approach each other when the piece 7 rotates in one direction relative to the sleeve 8. The tooth surfaces 11b of the dog teeth 11 of the piece 7 and the tooth surfaces 12b of the dog teeth 12 of the sleeve 8 are arranged to face and approach each other when the piece 7 rotates in a direction opposite to the above one direction relative to the sleeve 8. In the present embodiment, in the rotation direction of the piece 7, a direction in which the tooth surfaces 11a of the dog teeth 11 of the piece 7 and the tooth surfaces 12a of the dog teeth 12 of the sleeve 8 approach each other is referred to as "negative rotation direction". On the other hand, a direction in which the tooth surfaces 11b of the dog teeth 11 of the piece 7 and the tooth surfaces 12b of the dog teeth 12 of the sleeve 8 approach each other is referred to as "positive rotation direction". That is, in FIGS. 1 and 2, the leftward direction in the drawing is the positive rotation direction of the piece 7, and the rightward direction is the negative rotation direction.

These dog teeth 11 and 12 constitute a meshing dog clutch. The sleeve 8 moves in the direction approaching the piece 7 (engaging direction) to allow the dog teeth 12 of the sleeve 8 to mesh with the dog teeth 11 of the piece 7 in a perfectly combined state, so that the sleeve 8 and the piece 7 can be engaged with each other. On the other hand, the sleeve 8 moves in the direction separating from the piece 7 (releasing direction) to separate the dog teeth 12 of the sleeve 8 from the dog teeth 11 of the piece 7, so that the engagement state between the sleeve 8 and the piece 7 can be released.

Each of the dog teeth 11 of the piece 7 has an end surface 11d which is arranged to face the sleeve 8 at a position closest to the sleeve 8 in the axial direction. In each of the dog teeth 11 of the piece 7, a large tapered surface 11c (tooth side connection surface) is formed between the tooth surface 11a and the end surface 11d. The large tapered surface 11c is formed on the tooth surface 11a of the dog tooth 11 at a side opposing the sleeve 8. The large tapered surface 11c connects the end surface 11d and the tooth surface 11a of the dog tooth 11 to each other.

Similarly, each of the dog teeth 12 of the sleeve 8 has an end surface 12d which is arranged to face the piece 7 at a position closest to the piece 7 in the axial direction. Also in each of the dog teeth 12 of the sleeve 8, a large tapered surface 12c (engaging tooth side connection surface) is formed between the tooth surface 12a and the end surface 12d. The large tapered surface 12c is formed on the tooth surface 12a of the dog tooth 12 at a side opposing the piece 7. The large tapered surface 12c connects the end surface 12d and the tooth surface 12a of the dog tooth 12 to each other.

One end of the large tapered surface 11c is connected to the vicinity of the center of the end surface 11d, and the other end thereof is connected to the tooth surface 11a at a position shifted toward the tooth base (toward the side separating from the sleeve 8) by approximately a quarter the length of the tooth surface 11a. One end of the large tapered surface 12c is connected to the vicinity of the center of the end surface 12d, and the other end thereof is connected to the tooth surface 12a at a position shifted toward the tooth base (toward the side separating from the piece 7) by approximately a quarter the length of the tooth surface 12a. The positions of the ends of the large tapered surfaces 11c and 12c can be selected in any manner. The tapered angle of the large tapered surface 11c is substantially equal to the tapered angle of the large tapered surface 12c. The large tapered surfaces 11c and 12c preferably can make surface contact with each other.

The large tapered surfaces 11c of the dog teeth 11 of the piece 7 and the large tapered surfaces 12c of the dog teeth 12 of the sleeve 8 are formed in such a manner that they can face each other and preferably partially come into contact with each other when the sleeve 8 approaches the piece 7 or when the tooth surfaces 11a of the piece 7 and the tooth surfaces 12a of the sleeve 8 approach each other. That is, the large tapered surfaces 12c of the dog teeth 12 of the sleeve 8 are formed on the opposite side in the rotation direction to the large tapered surfaces 11c of the dog teeth 11 of the piece 7. In the example of FIG. 2, the large tapered surfaces 11c of the piece 7 are formed on the tooth surfaces 11a on the right side in the drawing, and the large tapered surfaces 12c of the sleeve 8 are formed on the tooth surfaces 12a on the left side in the drawing.

Since the large tapered surfaces 11c and 12c are formed in this manner, the shape of each of the dog teeth 11 is asymmetric to the shape of each of the dog teeth 12 along a direction from the end to the tooth base (stroke direction) when viewed in the sectional shape along the circumferential direction around the rotation shaft 13 (that is, in the shape illustrated in FIGS. 1 and 2). That is, as illustrated in FIG. 2, a front edge end 11e of the tooth surface 11a of the piece 7 is arranged on the back side in the axial direction with respect to a front edge end 11f of the tooth surface 11b, and the large tapered surface 11c is arranged in front of the tooth surface 11a when viewed from the sleeve 8. When viewed from the piece 7, a front edge end 12e of the tooth surface 12a of the sleeve 8 is arranged on the back side in the axial direction with respect to a front edge end 12f of the tooth surface 12b, and the large tapered surface 12c is arranged in front of the tooth surface 12a. In other words, a boundary position between the large tapered surface 11c and the tooth surface 11a (that is, the front edge end 11e) is superimposed on the tooth surface 11b, and a boundary position between the large tapered surface 12c and the tooth surface 12a (that is, the front edge end 12e) is superimposed on the tooth surface 12b when viewed from the circumferential direction.

Since the large tapered surfaces 11c and 12c are formed, the area of the tooth surface 11a and the area of the tooth surface 12a are respectively smaller than the area of the tooth surface 11b and the area of the tooth surface 12b. In the following description, the tooth surface 11a having a smaller area among the pair of tooth surfaces of each of the dog teeth 11 and the tooth surface 12a having a smaller area among the pair of tooth surfaces of each of the dog teeth 12 are also referred to as "small tooth surfaces", and the tooth surfaces 11b and 12b having a larger area are also referred to as "large tooth surfaces". The length of the small tooth surface 11a from the side corresponding to the end surface 11d to the tooth end and the length of the small tooth surface 12a from the side corresponding to the end surface 12d to the tooth end are respectively shorter than the length of the large tooth surface 11b and the length of the large tooth surface 12b. In the present embodiment, the large tooth surface 11b having a larger area among the pair of tooth surfaces and the large tooth surface 12b having a large area among the pair of tooth surfaces are used as meshing surfaces which mesh with each other in the engagement. As illustrated in FIGS. 1 and 2, the large tooth surfaces 11b and 12b which are used as the meshing surfaces are chambered to form tapered surfaces also at the side corresponding to the end surfaces 11d and 12d. The large tapered surfaces 11c connected to the small tooth surfaces 11a and the large tapered surfaces 12c connected to the small tooth surfaces 12a are provided for allowing the dog teeth 12 of the sleeve 8 to easily enter the spaces between the dog teeth 11 of the piece 7. Thus, the area of each of the large tapered surfaces 11c and 12c is larger than the area of each of the tapered surfaces connected to the large tooth surfaces 11b and 12b.

Since the large tapered surfaces 11c and 12c are respectively formed on the dog teeth 11 and 12, the width of each of the dog teeth 11 and 12 in the circumferential direction on the side opposing each other in the axial direction is small. That is, in each of the dog teeth 11 and 12, the width of each of the end surfaces 11d and 12d in the circumferential direction is the smallest, and the width in the circumferential direction gradually increases toward a direction in which the piece 7 and the sleeve 8 separate from each other when viewed in the sectional shape along the circumferential direction around the rotation shaft 13. When viewed from the sleeve 8, a front part in the axial direction which is connected to the front edge end 11e of the small tooth surface 11a of the piece 7 (that is, the large tapered surface 11c) is formed so as not to project from the small tooth surface 11a in the circumferential direction. Similarly, when viewed from the piece 7, a front part in the axial direction which is connected to the front edge end 12e of the small tooth surface 12a of the sleeve 8 (that is, the large tapered surface 12c) is formed so as not to project from the small tooth surface 12a in the circumferential direction.

The ECU 6 controls the operations of the engine 2, the first motor generator MG1, the second motor generator MG2, and the actuator 9 to control running of the vehicle. In particular, in the present embodiment, the ECU 6 drives the first motor generator MG1 and the actuator 9 to appropriately change the relative position between the sleeve 8 and the piece 7 of the engagement device 1 to thereby perform engagement control for engaging the sleeve 8 with the piece 7.

In the engagement control, the ECU 6 controls the sleeve 8 and the piece 7 in accordance with the following processes (i) to (iii).
(i) The first motor generator MG1 is driven to perform rotation speed control for rotating the piece 7 in a direction in which the small tooth surfaces 11a of the piece 7 and the small tooth surfaces 12a of the sleeve 8 come into contact with each other, that is, in the negative rotation direction.
(ii) After the rotation speed of the piece 7 comes into a predetermined target rotation range (zero rotation to a predetermined negative rotation speed), the actuator 9 is driven to perform a stroke operation for moving the sleeve 8 to approach the piece 7 along the approaching direction from the sleeve 8 to the piece 7 in the stroke direction.
(iii) After the sleeve 8 is allowed to approach the piece 7 until the sleeve 8 completes a predetermined stroke condition (for example, the sleeve 8 has moved by a predetermined stroke amount), torque change control for adding a torque in the positive direction is performed on the first motor generator MG1 to change the rotation direction of the piece 7 from the negative direction to the positive direction so that the large tooth surfaces 11b of the piece 7 and the large tooth surfaces 12b of the sleeve 8 are meshed with each other.

The ECU 6 is physically an electronic circuit which is mainly composed of a known microcomputer including a central processing unit (CPU), a random access memory (RAM), a read only memory (ROM), and an interface. The above function of the ECU 6 is achieved by loading an application program held by the ROM to the RAM and executing the loaded application program by the CPU to thereby allow various devices inside the hybrid vehicle 100 to operate under the control of the CPU and perform reading and writing of data in the RAM and the ROM. The function of the ECU 6 is not limited to the above function, and the ECU 6 has other various functions used as an ECU of the hybrid vehicle 100. The above ECU may be provided with a plurality of ECUs including an engine ECU which controls the engine 2, a motor ECU which controls the first motor generator MG1 and the second motor generator MG2, and a battery ECU which monitors the battery.

Figure 3:
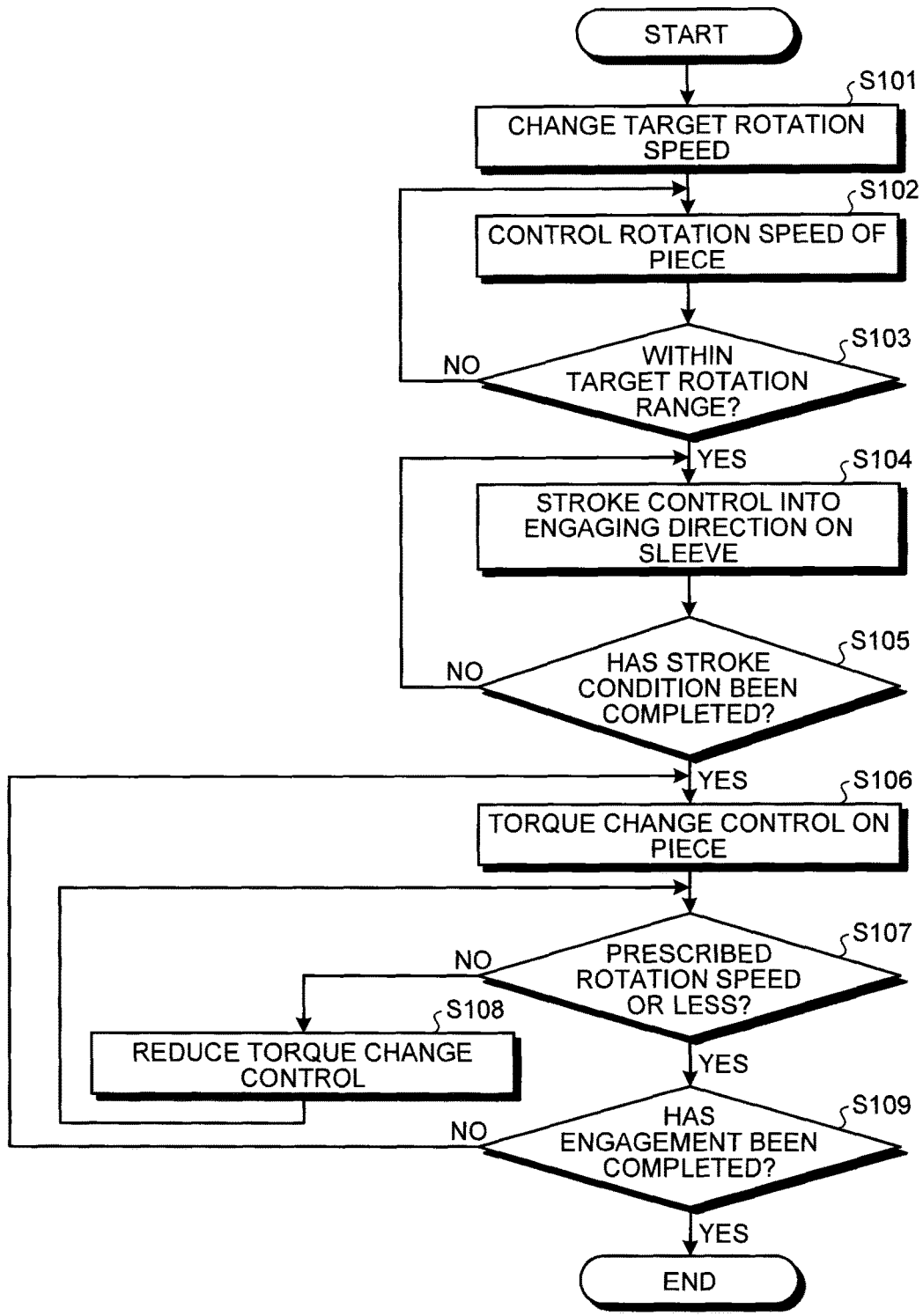
FIG. 3 is a flow chart of engagement control processing performed by the engagement device of the first embodiment.
Figure 4:
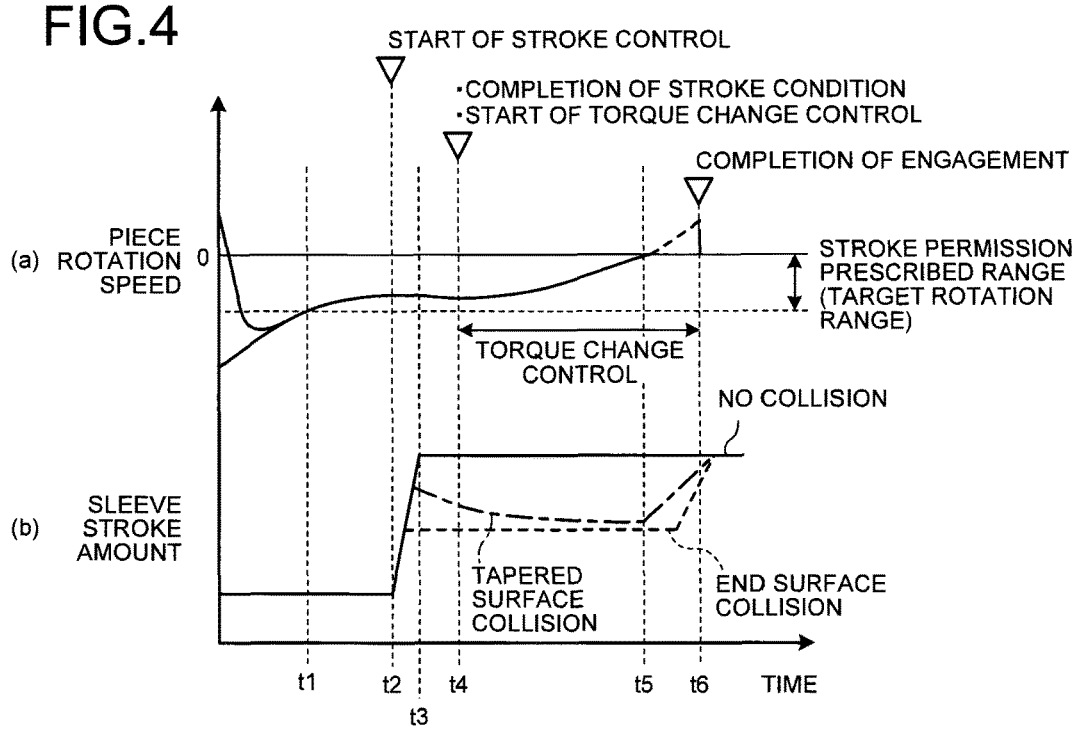
FIG. 4 is a time chart of the engagement control processing performed by the engagement device of the first embodiment.

Next, the operation of the engagement device 1 according to the first embodiment will be described with reference to FIGS. 3 to 10. First, engagement control processing for engaging the piece 7 and the sleeve 8 with each other performed by the engagement device 1 will be described in outline with reference to FIGS. 3 and 4. FIG. 3 is a flow chart of the engagement control processing performed by the engagement device of the first embodiment. FIG. 4 is a time chart of the engagement control processing performed by the engagement device of the first embodiment.

The processing illustrated in the flow chart of FIG. 3 is performed by the ECU 6. In the time chart of FIG. 4, (a) represents the rotation speed of the piece 7, and (b) represents the stroke amount of the sleeve 8. In FIG. 4, the rotation speed of the piece 7 becomes negative rotation below zero, which indicates that the piece 7 rotates in a direction in which the small tooth surfaces 11a of the dog teeth 11 of the piece 7 approach the small tooth surfaces 12a of the dog teeth 12 of the sleeve 8. In FIG. 4, the rotation speed of the piece 7 becomes positive rotation above zero, which indicates that the piece 7 rotates in a direction in which the large tooth surfaces 11b of the dog teeth 11 of the piece 7 approach the large tooth surfaces 12b of the dog teeth 12 of the sleeve 8. In FIG. 4, as the stroke amount of the sleeve 8 transitions in an upward direction, the sleeve 8 moves in the engaging direction to approach the piece 7.

Description will be made in accordance with the flow chart of FIG. 3. First, the target rotation speed of the piece 7 is changed to a target rotation speed for engagement operation (step S101). Then, the first motor generator MG1 is feedback-controlled on the basis of the changed target rotation speed to perform rotation speed control on the piece 7 (step S102). The target rotation speed in the rotation speed control is set in a rotation direction in which the large tooth surfaces 11b and 12b which mesh with each other in engagement between the piece 7 and the sleeve 8 do not collide with each other. That is, the target rotation speed is set to a rotation speed in a rotation direction in which the small tooth surfaces 11a on the side provided with the large tapered surfaces 11c and the small tooth surfaces 12a on the side provided with the large tapered surfaces 12c approach each other, that is, the negative rotation direction. Since the target rotation speed is only required to be a rotation speed in the rotation direction in which the large tooth surfaces 11b and 12b do not collide with each other, the target rotation speed can be set to zero rotation which is capable of maintaining the distance between the large tooth surfaces 11b and 12b. Therefore, "the negative rotation direction" into which the piece 7 is controlled by the rotation speed control includes both the rotation direction in which the small tooth surfaces 11a and 12a approach each other and the zero rotation.

Then, it is determined whether the rotation speed of the piece 7 has transitioned into a predetermined target rotation range by the rotation speed control in step S102 (step S103). The target rotation range is, for example, a predetermined range including the target rotation speed set in step S101, and can be set to a range from zero rotation to a predetermined negative rotation speed as indicated by "stroke permission prescribed range" in FIG. 4. As the condition for determining the transition into the target rotation range, for example, one or a plurality of conditions including that the piece rotation speed remains within the target rotation range for a certain time, that the amount of a change in the piece rotation speed within the target rotation range (the inclination of the graph of the piece rotation speed in FIG. 4) becomes a certain value or less (the change amount becomes small), and that the piece rotation speed comes into the target rotation range may be set. When these set determination conditions are satisfied, the ECU 6 determines that the rotation speed of the piece 7 has transitioned into the predetermined target rotation range.

When the rotation speed of the piece 7 is determined to fall outside the predetermined target rotation range as the result of the determination in step S103 (No in step S103), the processing returns to step S102 and the rotation speed control is continuously performed to allow the rotation speed of the piece to transition into the target rotation range.

On the other hand, when it is determined that the rotation speed of the piece 7 has transitioned into the predetermined target rotation range (Yes in step S103), stroke control for moving the sleeve 8 in the engaging direction is performed while continuously performing the rotation speed control (step S104). Since the movement control is started at the point when the rotation speed of the piece 7 comes into the target rotation range having an allowance without waiting for convergence of the rotation speed of the piece 7 into the target rotation speed, it is possible to promptly shift to the next processing and promptly execute the engagement control. In the stroke control, the ECU 6 controls the actuator 9 to apply a thrust force in the engaging direction to the sleeve 8 to thereby move the sleeve 8 in the engaging direction.

In the time chart of FIG. 4, the rotation speed of the piece 7 comes into the target rotation range at time t1, and the determination of the transition into the target rotation range in step S103 is performed at time t2 when a predetermined time has passed with a state in which the rotation speed is maintained within the target rotation range. Then, the stroke control in the engaging direction on the sleeve 8 is started at the time t2. After the time t2, the stroke amount of the sleeve 8 gradually increases. That is, the sleeve 8 approaches the piece 7. Further, since the rotation speed of the piece 7 at this point is within the target rotation range from the zero rotation to the predetermined negative rotation speed, the piece 7 rotates in the negative rotation direction.

Referring back to FIG. 3, it is determined whether a predetermined stroke condition for the stroke control on the sleeve 8 has been completed (step S105).

The stroke condition (movement condition) is a condition for determining a state in which the sleeve 8 can be allowed to approach the piece 7 by a predetermined stroke amount. The stroke condition includes, for example, that the sleeve 8 has moved by a predetermined stroke amount and that a time required for the sleeve 8 to move by a predetermined stroke amount has passed. The movement of the sleeve 8 by the predetermined stroke amount can be estimated or detected on the basis of various pieces of sensor information such as the movement amount of the sleeve 8 detected by a stroke sensor and the elapsed time from the start of the stroke control.

Further, in the present embodiment, the stroke condition also includes that the dog teeth 12 of the sleeve 8 have collided with the dog teeth 11 of the piece 7. Such collision can be detected, for example, when the stroke amount of the sleeve 8 is maintained for a certain time at a specific value corresponding to a position where the large tapered surfaces 11c and 12c collide with each other or a position where the end surfaces 11d and 12d collide with each other.

When it is determined that the stroke condition of the sleeve 8 has not been completed as the result of the determination in step S105 (No in step S105), the processing returns to step S104, and the stroke control on the sleeve 8 is continuously performed.

On the other hand, when it is determined that the stroke condition of the sleeve 8 has been completed (Yes in step S105), the first motor generator MG1 is controlled to perform torque change control in the positive rotation direction on the piece 7 while continuously performing the stroke control (step S106). The torque change control is control for changing the driving torque of the piece 7 by adding an additional torque to the feedback control amount (torque) of the rotation speed control in a feed forward manner. In the torque change control of the present embodiment, an additional torque in the positive rotation direction is added so that the rotation direction of the piece 7 is gradually changed from the negative rotation direction in which the small tooth surfaces 11a on the side provided with the large tapered surfaces 11c and the small tooth surfaces 12a on the side provided with the large tapered surfaces 12c approach each other to the positive rotation direction in which the tooth surfaces 11b and the tooth surfaces 12b which mesh each other in the engagement between the piece 7 and the sleeve 8 approach each other.

In the time chart of FIG. 4, when collision between the dog teeth 12 of the sleeve 8 and the dog teeth 11 of the piece 7 do not occur after the start of the stroke control at the time t2, the movement by a predetermined stroke amount is completed at time t3. Then, at time t4 after the time t3, it is determined that a time sufficient to allow the sleeve 8 to approach the piece 7 by the predetermined stroke amount has passed and the stroke condition has been completed, and the torque change control is started.

After the start of the torque change control at the time t4, the rotation speed of the piece 7 is gradually changed from the negative rotation direction to the positive rotation direction by gradually adding the positive torque to the driving torque of the piece 7. The piece 7 rotates in the direction in which the small tooth surfaces 11a of the piece 7 and the small tooth surfaces 12a of the sleeve 8 approach each other in an interval up to time t5 when the rotation speed becomes zero. After the time t5, the rotation speed of the piece 7 becomes a positive rotation speed, and the rotation direction of the piece 7 is inverted into the direction in which the large tooth surfaces 11b of the piece 7 and the large tooth surfaces 12b of the sleeve 8 approach each other.

Referring back to FIG. 3, it is confirmed whether the rotation speed of the piece 7 is equal to or less than a prescribed rotation speed (step S107). A predetermined value in the positive rotation direction can be set as the prescribed rotation speed. That is, in this determination block, it is confirmed that the rotation speed of the piece 7 has been changed to a relatively small rotation speed in the positive rotation direction by the torque change control. When the rotation speed of the piece 7 exceeds the prescribed rotation speed (No in step S107), the rotation speed of the piece 7 is determined to be excessively changed in the positive rotation direction due to the loss of balance caused by torque sweep, and the additional torque of the torque change control is reduced to reduce the change in the rotation speed (step S108). As the reduction amount of the additional torque, the additional torque may be zeroized or reduced by a predetermined amount. Accordingly, the piece rotation speed which has been excessively increased in the positive rotation direction is reduced. The processing in step S108 is repeatedly performed until the rotation speed of the piece is stabilized in the prescribed rotation speed or less.

On the other hand, when the rotation speed of the piece 7 is equal to or less than the prescribed rotation speed (Yes in step S107), it is determined whether the engagement between the dog teeth 12 of the sleeve 8 and the dog teeth 11 of the piece 7 has been completed (step S109). As the determination of the engagement completion, for example, known methods such as detecting differential rotation between the sleeve 8 and the piece 7 by a rotation speed sensor to detect that the differential rotation becomes zero and detecting the movement amount of the sleeve 8 by a stroke sensor to detect that the dog teeth 12 of the sleeve 8 are located at positions for completely meshing with the dog teeth 11 of the piece 7 may be used. When the engagement has not been completed (No in step S109), the processing returns to step S106, and the torque change control is again performed. On the other hand, when the engagement has been completed (Yes in step S109), this control flow is finished.

In the time chart of FIG. 4, the piece 7 becomes positive rotation after the time t5 so that the piece 7 rotates in the direction in which the large tooth surfaces 11b of the piece 7 and the large tooth surfaces 12b of the sleeve 8 approach each other, and it is determined at time t6 that the large tooth surfaces 11b of the piece 7 and the large tooth surfaces 12b of the sleeve 8 mesh with each other and the engagement between the sleeve 8 and the piece 7 has been completed.

Figure 5:
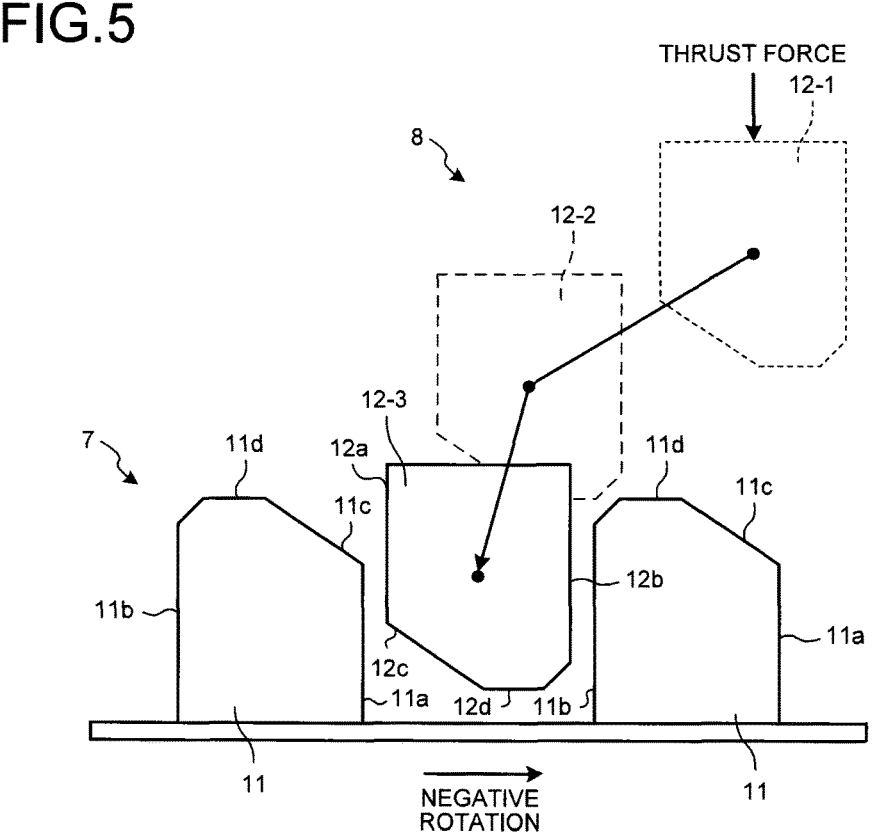
FIG. 5 is a schematic view illustrating transition of the positional relationship between a sleeve and a piece when dog teeth of the sleeve enter spaces between teeth without coming into contact with dog teeth of the piece in an engagement operation.
Figure 6:
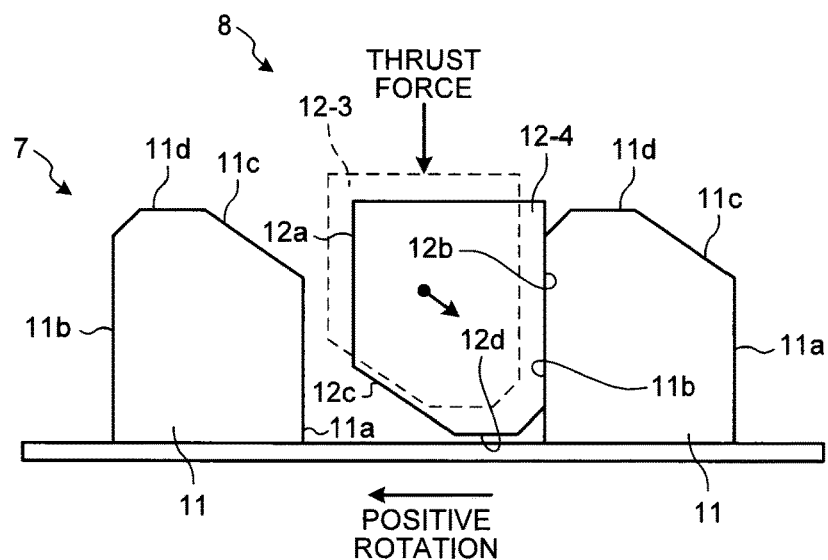
FIG. 6 is a schematic view illustrating the transition of the positional relationship between the sleeve and the piece when the dog teeth of the sleeve enter the spaces between teeth without coming into contact with the dog teeth of the piece in the engagement operation.
Figure 7:
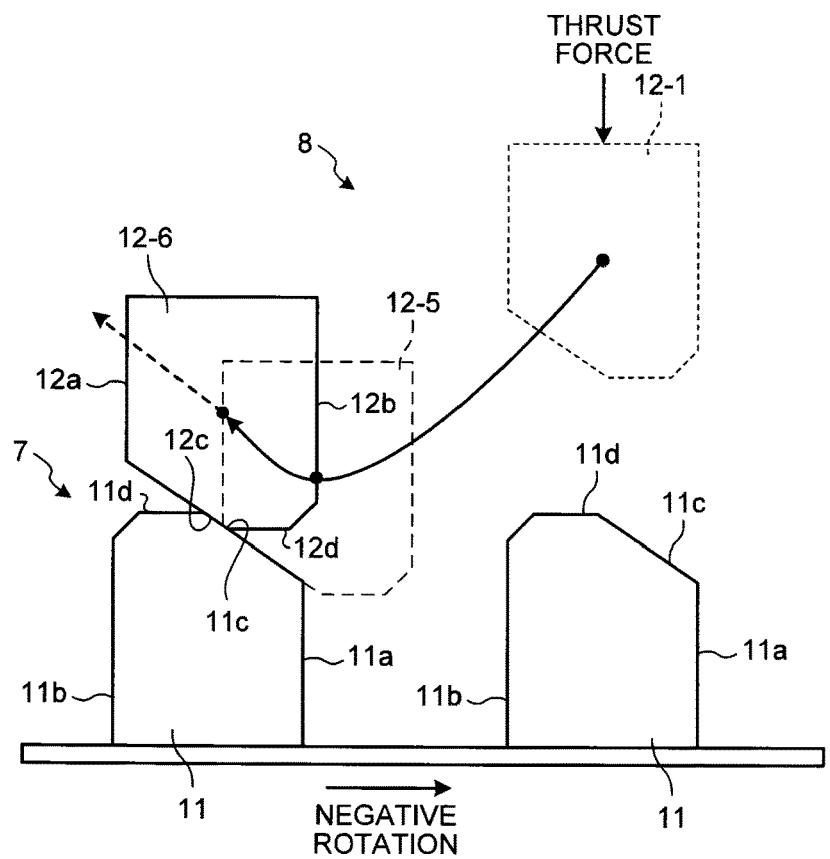
FIG. 7 is a schematic view illustrating transition of the positional relationship between the sleeve and the piece when large tapered surfaces of the dog teeth of the sleeve collide with large tapered surfaces of the dog teeth of the piece in the engagement operation.
Figure 8:
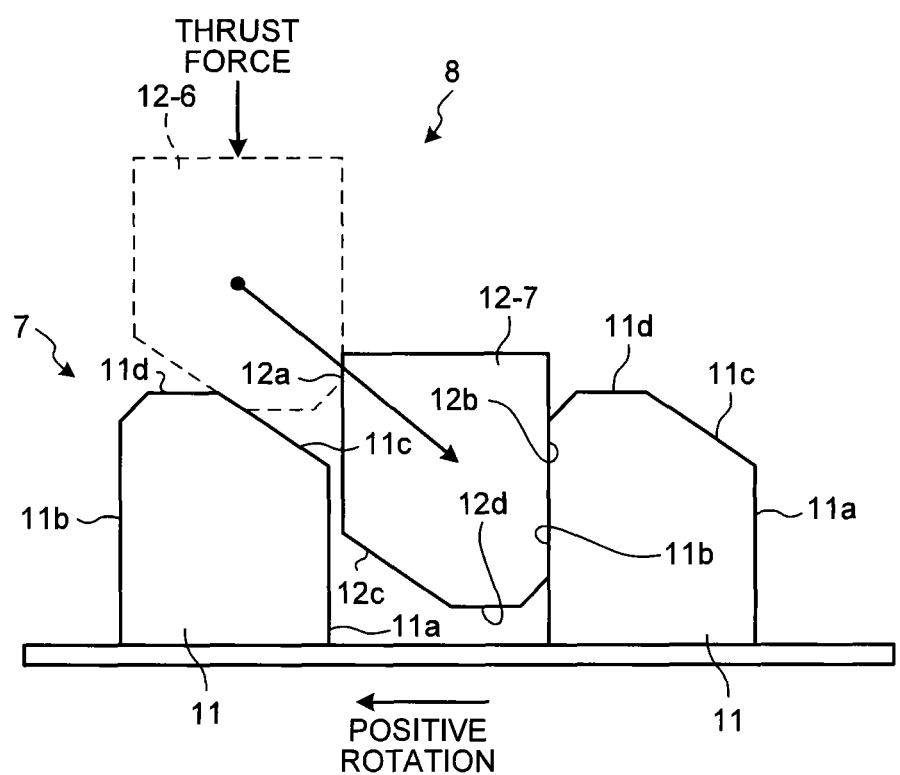
FIG. 8 is a schematic view illustrating the transition of the positional relationship between the sleeve and the piece when the large tapered surfaces of the dog teeth of the sleeve collide with the large tapered surfaces of the dog teeth of the piece in the engagement operation.
Figure 9:
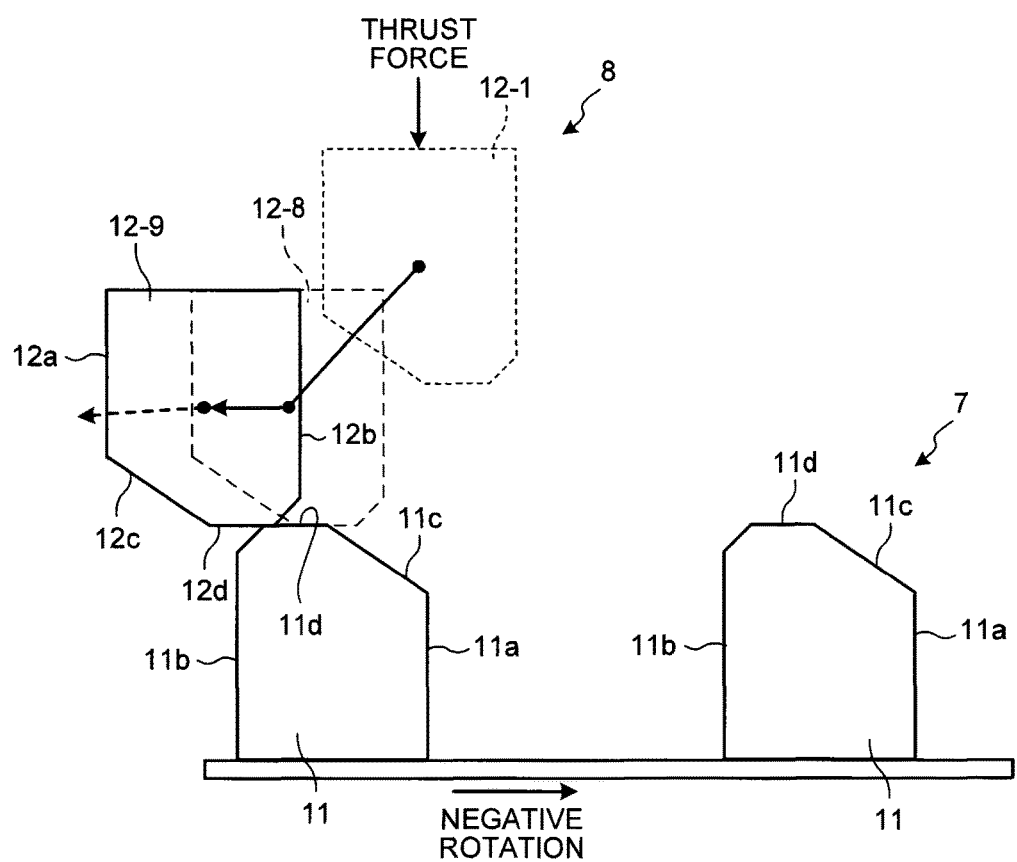
FIG. 9 is a schematic view illustrating transition of the positional relationship between the sleeve and the piece when end surfaces of the dog teeth of the sleeve collide with end surfaces of the dog teeth of the piece in the engagement operation.
Figure 10:
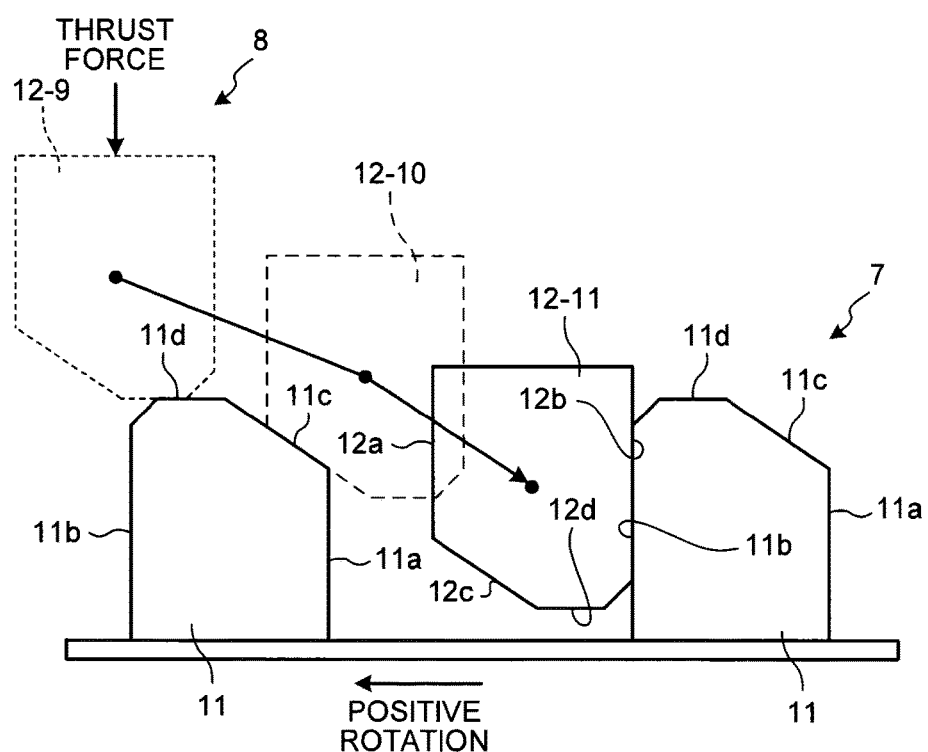
FIG. 10 is a schematic view illustrating the transition of the positional relationship between the sleeve and the piece when the end surfaces of the dog teeth of the sleeve collide with the end surfaces of the dog teeth of the piece in the engagement operation.

Next, a meshing operation between the sleeve 8 and the piece 7 in the above engagement operation will be specifically described for each pattern with reference to the time chart of FIG. 4 and FIGS. 5 to 10. FIGS. 5 and 6 are schematic views illustrating transition of the positional relationship between the sleeve and the piece when the dog teeth of the sleeve enter spaces between the teeth without coming into contact with the dog teeth of the piece in the engagement operation. FIGS. 7 and 8 are schematic views illustrating transition of the positional relationship between the sleeve and the piece when the large tapered surfaces of the dog teeth of the sleeve collide with the large tapered surfaces of the dog teeth of the piece in the engagement operation. FIGS. 9 and 10 are schematic views illustrating transition of the positional relationship between the sleeve and the piece when the end surfaces of the dog teeth of the sleeve collide with the end surfaces of the dog teeth of the piece in the engagement operation.

When the stroke operation for allowing the sleeve 8 to approach the piece 7 has been performed and the stroke condition has been completed, the positional relationship between the sleeve 8 and the piece 7 may include the following three patterns.

(1) A state in which the dog teeth 12 of the sleeve 8 enter spaces between the teeth without coming into contact with the dog teeth 11 of the piece 7

(2) A state in which the large tapered surfaces 12c of the dog teeth 12 of the sleeve 8 come into contact with the large tapered surfaces 11c of the dog teeth 11 of the piece 7

(3) A state in which the end surfaces 12d of the dog teeth 12 of the sleeve 8 come into contact with the end surfaces 11d of the dog teeth 11 of the piece 7

In the time chart of FIG. 4, the pattern (1) is indicated by a solid line (described as "NO COLLISION" in FIG. 4), the pattern (2) is indicated by a dash-dot line (described as "TAPERED SURFACE COLLISION" in FIG. 4), and the pattern (3) is indicated by a dotted line (described as "END SURFACE COLLISION" in FIG. 4) for the transition of the stroke amount of the sleeve. Hereinbelow, the transition of the positional relationship between the sleeve 8 and the piece 7 in each of the patterns (1) to (3) will be described.

(1) Transition of the positional relationship between the piece 7 and the sleeve 8 when the dog teeth 12 of the sleeve 8 enter the spaces between the teeth without coming into contact with the dog teeth 11 of the piece 7

FIGS. 5 and 6 illustrate the transition of the position of a dog tooth 12 of the sleeve 8 with respect to the piece 7 from the start of the stroke operation until the completion of the engagement in this pattern in four stages indicated by reference signs 12-1, 12-2, 12-3, and 12-4.

When the stroke control is started at the time t2 in the time chart of FIG. 4, the dog tooth 12 of the sleeve 8 is located at a position sufficiently away from the piece 7 as indicated by the reference sign 12-1 in FIG. 5.

While the stroke amount increases from the time t2 to the time t3 in the time chart of FIG. 4, the dog tooth 12 of the sleeve 8 approaches the piece 7 while moving in a direction in which the small tooth surface 12a relatively approaches the piece 7 (the leftward direction in FIG. 5) by the negative rotation of the piece 7 and the thrust force in the engaging direction of the sleeve 8 as indicated by the reference sign 12-2 in FIG. 5. Then, at the time t3 in the time chart of FIG. 4, the dog tooth 12 of the sleeve 8 enters a space between two dog teeth 11 of the piece 7 without making contact with the dog teeth 11 of the piece 7 as indicated by the reference sign 12-3 in FIG. 5.

When the torque change control is performed from the time t4 and the rotation direction of the piece 7 is switched to the positive rotation at the time t5 as illustrated in FIG. 4, the dog tooth 12 of the sleeve 8 moves in a direction in which the large tooth surface 12b relatively approaches the piece 7 (the rightward direction in FIG. 6) as illustrated in FIG. 6. Then, when the engagement is completed at the time t6 of FIG. 4, the large tooth surface 12b of the dog tooth 12 of the sleeve 8 is meshed with the large tooth surface 11b of the piece 7 as indicated by the reference sign 12-4 in FIG. 6.

(2) Transition of the positional relationship between the piece 7 and the sleeve 8 when the large tapered surfaces 12c of the dog teeth 12 of the sleeve 8 come into contact with the large tapered surfaces 11c of the dog teeth 11 of the piece 7

FIGS. 7 and 8 illustrate the transition of the position of a dog tooth 12 of the sleeve 8 with respect to the piece 7 from the start of the stroke operation until the completion of the engagement in this pattern in four stages indicated by reference signs 12-1, 12-5, 12-6, and 12-7.

When the stroke control is started at the time t2 in the time chart of FIG. 4, the dog tooth 12 of the sleeve 8 is located at a position sufficiently away from the piece 7 as indicated by the reference sign 12-1 in FIG. 7.

While the stroke amount increases from the time t2 to the time t3 in the time chart of FIG. 4, the dog tooth 12 of the sleeve 8 approaches the piece 7 while moving in a direction in which the small tooth surface 12a relatively approaches the piece 7 (the leftward direction in FIG. 7) by the negative rotation of the piece 7 and the thrust force in the engaging direction of the sleeve 8. Then, as indicated by the reference sign 12-5 in FIG. 7, the large tapered surface 12c of the dog tooth 12 of the sleeve 8 collides with the large tapered surface 11c of a dog tooth 11 of the piece 7.

After the collision with the large tapered surface 11c of the piece 7, the sleeve 8 still continuously generates the thrust force in the engaging direction. Further, the sleeve 8 receives a pressing force from the piece 7 through the large tapered surface 12c by the negative rotation of the piece 7. When the pressing force received from the piece 7 is larger than the thrust force of the sleeve 8 and a frictional force between the large tapered surface 11c and the large tapered surface 12c which are in contact with each other is smaller than the pressing force, the dog tooth 12 of the sleeve 8 is pushed back in the releasing direction along the large tapered surface 11c of the piece 7 as indicated by the reference sign 12-6 in FIG. 7. In the time chart of FIG. 4, in an interval between a point when the large tapered surfaces 11c and 12c collide with each other after the time t2 and the time t5, the stroke amount of the sleeve 8 decreases, and the sleeve 8 is pushed back in the releasing direction.

At this point, when the large tapered surface 12c of the sleeve 8 passes the large tapered surface 11c of the piece 7, the dog tooth 12 of the sleeve 8 may jump over the dog tooth 11 of the piece 7 with which the dog tooth 12 has been in contact and move toward the next dog tooth 11 as indicated by a dotted arrow in FIG. 7. Further, when the frictional force between the large tapered surface 11c and the large tapered surface 12c which are in contact with each other is larger than the pressing force received from the piece 7, the dog tooth 12 of the sleeve 8 may remain at the position in the stroke direction where the dog tooth 12 collides with the dog tooth 11 of the piece 7. In this case, in the time chart of FIG. 4, the stroke amount of the sleeve 8 does not decrease in the releasing direction after the collision between the large tapered surfaces 11c and 12c, but is maintained at a value at the time of the collision up to the time t5 until when the piece 7 makes negative rotation.

When the torque change control is performed from the time t4 and the rotation direction of the piece 7 is switched to the positive rotation at the time t5 as illustrated in FIG. 4, the dog tooth 12 of the sleeve 8 increases the stroke amount thereof while moving in a direction in which the large tooth surface 12b relatively approaches the piece 7 (the rightward direction in FIG. 8) by the positive rotation of the piece 7 and the thrust force in the engaging direction of the sleeve 8 as illustrated in FIG. 8. That is, the dog tooth 12 moves to make the engagement deeper along the large tapered surface 11c of the piece 7. Then, when the engagement is completed at the time t6 of FIG. 4, the large tooth surface 12b of the dog tooth 12 of the sleeve 8 is meshed with the large tooth surface 11b of the piece 7 as indicated by the reference sign 12-7 in FIG. 8.

(3) Transition of the positional relationship between the piece 7 and the sleeve 8 when the end surfaces 12d of the dog teeth 12 of the sleeve 8 come into contact with the end surfaces 11d of the dog teeth 11 of the piece 7

FIGS. 9 and 10 illustrate the movement of a dog tooth 12 of the sleeve 8 from the start of the stroke operation until the completion of the engagement in this pattern in five stages indicated by reference signs 12-1, 12-8, 12-9, 12-10, and 12-11.

When the stroke control is started at the time t2 in the time chart of FIG. 4, the dog tooth 12 of the sleeve 8 is located at a position sufficiently away from the piece 7 as indicated by the reference sign 12-1 in FIG. 9.

While the stroke amount increases from the time t2 to time t3 in the time chart of FIG. 4, the dog tooth 12 of the sleeve 8 approaches the piece 7 while moving in a direction in which the small tooth surface 12a relatively approaches the piece 7 (the leftward direction in FIG. 9) by the negative rotation of the piece 7 and the thrust force in the engaging direction of the sleeve 8. Then, as indicated by the reference sign 12-8 in FIG. 9, the end surface 12d of the dog tooth 12 of the sleeve 8 collides with the end surface 11d of a dog tooth 11 of the piece 7.

After the collision with the end surface 11d of the piece 7, the sleeve 8 still continuously moves in the same direction relative to the piece 7 (the leftward direction in FIG. 9) along the end surface 11d of the dog tooth 11 of the piece 7 as indicated by the reference sign 12-9 in FIG. 9 by the negative rotation of the piece 7. The movement in the engaging direction of the sleeve 8 is restricted by the end surface 11d of the piece 7. Therefore, in the time chart of FIG. 4, in the interval between the point when the end surfaces collide with each other after the time t2 and the time t5, the stroke amount of the sleeve 8 is maintained at a value at the collision position.

At this point, when the end surface 12d of the sleeve 8 passes the end surface 11d of the piece 7, the dog tooth 12 of the sleeve 8 may jump over the dog tooth 11 of the piece 7 with which the dog tooth 12 has been in contact and move toward the next dog tooth 11 as indicated by a dotted arrow in FIG. 9.

When the torque change control is performed from the time t4 and the rotation direction of the piece 7 is switched to the positive rotation at the time t5 as illustrated in FIG. 4, the dog tooth 12 of the sleeve 8 first moves in a direction in which the large tooth surface 12b approaches the piece 7 along the end surface 11d of the piece 7 (the rightward direction in FIG. 10) by the positive rotation of the piece 7 as illustrated in FIG. 10. After the end surface 12d of the sleeve 8 passes the end surface 11d of the piece 7, the dog tooth 12 of the sleeve 8 moves to make the engagement deeper along the large tapered surface 11c of the piece 7 by the positive rotation of the piece 7 and the thrust force in the engaging direction of the sleeve 8 as indicated by the reference sign 12-10 in FIG. 10. Then, when the engagement is completed at the time t6 of FIG. 4, the large tooth surface 12b of the dog tooth 12 of the sleeve 8 is meshed with the large tooth surface 11b of the piece 7 as indicated by the reference sign 12-11 in FIG. 10.

Next, the effects of the engagement device 1 according to the first embodiment will be described.

The engagement device 1 of the present embodiment is provided with the piece 7 which is rotatably supported about the rotation shaft and has the plurality of dog teeth 11, the sleeve 8 which is movably supported along the axial direction of the rotation shaft and has the plurality of dog teeth 12, the first motor generator MG1 which rotates the piece 7 about the axis, the actuator 9 which moves the sleeve 8 in the axial direction, and the ECU 6 which controls the operations of the first motor generator MG1 and the actuator 9. The dog teeth 11 are formed on the piece 7 at the side opposing the sleeve 8 along the circumferential direction around the axis. The dog teeth 12 are formed on the sleeve 8 at the side opposing the piece 7 along the circumferential direction around the axis. Each of the dog teeth 11 has the pair of tooth surfaces 11a and 11b, and the tooth surfaces 11a and 11b of the dog teeth 11 face each other in the circumferential direction. Each of the dog teeth 12 has the pair of tooth surfaces 12a and 12b, and the tooth surfaces 12a and 12b of the dog teeth 12 face each other in the circumferential direction. When viewed from the sleeve 8, in the pair of tooth surfaces 11a and 11b of each of the dog teeth 11, the front edge end 11e of the small tooth surface 11a is arranged on the back side in the axial direction with respect to the front edge end 11f of the large tooth surface 11b. When viewed from the piece 7, in the pair of tooth surfaces 12a and 12b of each of the dog teeth 12, the front edge end 12e of the small tooth surface 12a is arranged on the back side in the axial direction with respect to the front edge end 12f of the large tooth surface 12b. The dog teeth 11 and 12 are formed to have a small width in the circumferential direction on the side opposing each other in the axial direction. The small tooth surfaces 11a of the dog teeth 11 and the small tooth surfaces 12a of the dog teeth 12 are arranged to face and approach each other when the piece 7 rotates in the negative rotation direction relative to the sleeve 8. The large tooth surfaces 11b of the dog teeth 11 and the large tooth surfaces 12b of the dog teeth 12 are arranged to face and approach each other when the piece 7 rotates in the positive rotation direction relative to the sleeve 8. When the piece 7 and the sleeve 8 are engaged with each other, the ECU 6 controls the actuator 9 to move the sleeve 8 in the direction approaching the piece 7 with the piece 7 rotating in the negative rotation direction relative to the sleeve 8. Further, after a predetermined stroke condition for the movement of the sleeve 8 relative to the piece 7 is satisfied, the ECU 6 controls the first motor generator MG1 to change the rotation speed of the piece 7 from a negative rotation speed to zero or more.

In this configuration, the piece 7 is rotated in the direction in which the small tooth surfaces 11a and 12a located opposite to the large tooth surfaces 11b and 12b as the meshing surfaces approach each other at the beginning of the engagement operation between the piece 7 and the sleeve 8. Accordingly, it is possible to prevent the large tooth surfaces 11b and 12b as the meshing surfaces from meshing with each other with an extremely small contact area before the stroke operation of the sleeve 8 progresses. Further, the control is made to change the rotation speed of the piece 7 from a negative rotation speed to zero or more after the stroke operation of the sleeve 8 satisfies the predetermined stroke condition. Thus, it is possible to change the rotation of the piece 7 into the direction in which the large tooth surfaces 11b and 12b as the meshing surfaces of the dog teeth 11 and 12 approach each other to thereby allow the large tooth surfaces 11b and 12b to mesh with each other after the dog teeth 12 of the sleeve 8 enter the spaces between the dog teeth 11 of the piece 7 to an extent sufficient to maintain the engagement. As a result, it is possible to increase the area of a meshing part between the large tooth surfaces 11b of the piece 7 and the large tooth surfaces 12b of the sleeve 8 to ensure a meshing amount sufficient to maintain the engagement. Therefore, the engagement can be reliably performed.

Further, the piece 7 is rotated in the direction in which the small tooth surfaces 11a and 12a located opposite to the large tooth surfaces 11b and 12b as the meshing surfaces approach each other at the beginning of the engagement operation. Therefore, when the sleeve 8 first comes into contact with the piece 7, it is possible to allow the large tapered surfaces 11c of the piece 7 and the large tapered surfaces 12c of the sleeve 8 or the end surfaces 11d of the piece 7 and the end surfaces 12d of the sleeve 8 to make surface contact with each other, and prevent a large force from being locally applied to the dog teeth 11 and 12 in the collision. As a result, it is possible to prevent generation of a high surface pressure and improve the durability of the engagement device 1.

In the engagement device 1 of the present embodiment, when the ECU 6 determines that the sleeve 8 can be allowed to approach the piece 7 by a predetermined distance, the stroke condition is determined to be satisfied. This configuration enables the large tooth surfaces 11b and 12b as the meshing surfaces to mesh with each other after the sleeve 8 sufficiently approaches the piece 7. Therefore, the engagement can be more reliably performed.

In the engagement device 1 of the present embodiment, the ECU 6 controls the actuator 9 to further move the sleeve 8 in the direction approaching the piece 7 while changing the rotation speed of the piece 7 from a negative rotation speed to zero or more. This configuration enables the dog teeth 12 of the sleeve 8 to further enter the spaces between the dog teeth 11 of the piece 7 while the large tooth surfaces 11b and 12b as the meshing surfaces approach each other. Therefore, it is possible to increase the area of the meshing part between the large tooth surfaces 11b and 12b when the large tooth surfaces 11b and 12b mesh with each other, and thereby more reliably perform the engagement.

In the engagement device 1 of the present embodiment, each of the dog teeth 11 of the piece 7 has the end surface 11d which is arranged to face the sleeve 8 at the position closest to the sleeve 8 in the axial direction and the large tapered surface 11c having a tapered shape which connects the end surface 11d and the small tooth surface 11a to each other. Further, each of the dog teeth 12 of the sleeve 8 has the end surface 12d which is arranged to face the piece 7 at the position closest to the piece 7 in the axial direction and the large tapered surface 12c having a tapered shape which connects the end surface 12d and the small tooth surface 12a to each other.

In this configuration, the tip part of each of the dog teeth 11 on the side corresponding to the small tooth surface 11a and the tip part of each of the dog teeth 12 on the side corresponding to the small tooth surface 12a can be reduced by forming the large tapered surfaces 11c and 12c on the dog teeth 11 and 12 to expand a space between the dog teeth 11 and 12 when the dog teeth 11 and 12 approach each other while relatively rotating in the direction in which the small tooth surfaces 11a and 12a approach each other. Accordingly, it is possible to prevent the dog teeth 12 of the sleeve 8 from colliding with the dog teeth 11 of the piece 7 at an early stage at the beginning of the engagement operation and allow the dog teeth 12 to enter deeper positions. Further, each of the large tapered surfaces 11c and 12c has a tapered shape extending along the stroke direction. Therefore, when the sleeve 8 comes into contact with the piece 7, the relative position between the sleeve 8 and the piece 7 can be smoothly displaced along the large tapered surfaces 11c and 12c. As a result, it is possible to promptly and accurately perform the engagement control.

In the engagement device 1 of the present embodiment, the ECU 6 controls the first motor generator MG1 to reduce the rotation speed of the piece 7 when the rotation speed of the piece 7 becomes a predetermined value in the positive rotation direction or more after the rotation speed is changed from a negative rotation speed to zero or more.

This configuration enables the rotation speed of the piece 7 to be controlled to a relatively small rotation speed in the positive direction. Thus, it is possible to reduce shock caused when the tooth surfaces 12b of the sleeve 8 come into contact with the tooth surfaces 11b of the piece 7. When the rotation speed of the piece 7 is relatively small, a time required until the tooth surfaces 11b and 12b mesh with each other after the rotation of the piece 7 is inverted can be extended. Thus, it is possible to insert the dog teeth 12 of the sleeve 8 into deeper positions in the spaces between the dog teeth 11 of the piece 7 by the stroke control on the sleeve 8. As a result, it is possible to more reliably perform the engagement.

Second Embodiment

Figure 11:
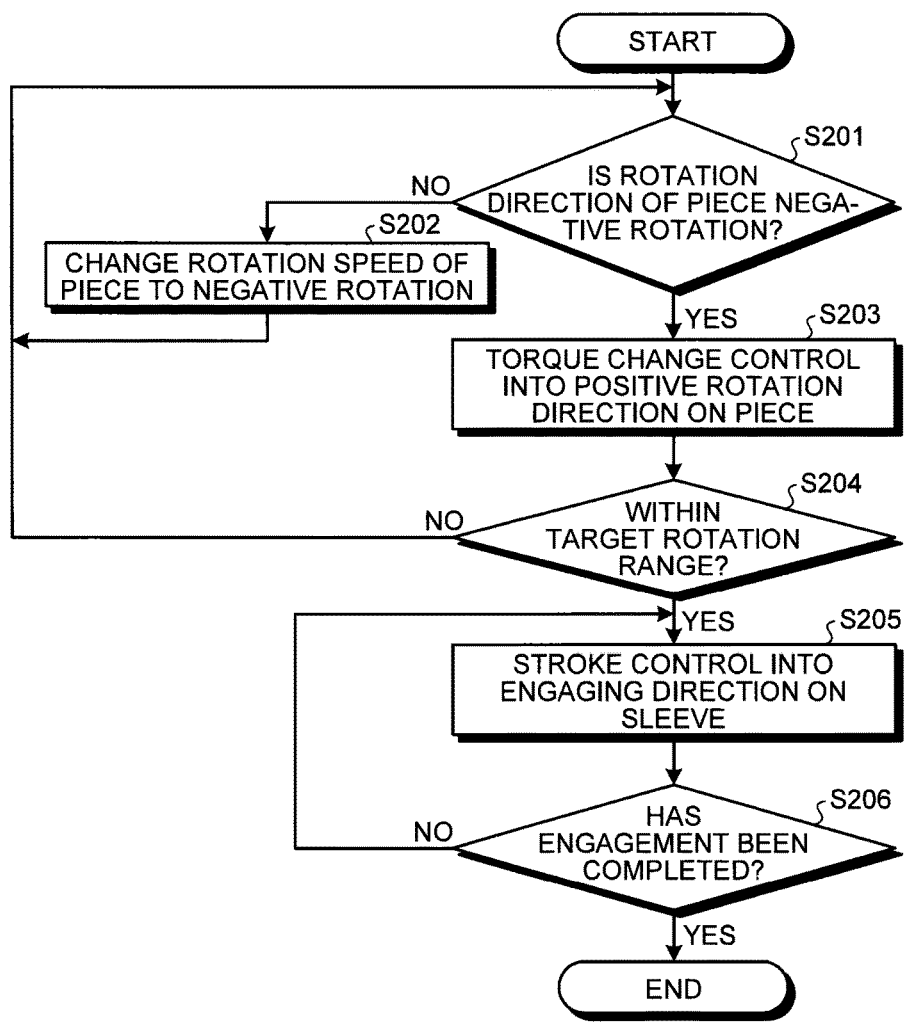
FIG. 11 is a flow chart of engagement control processing performed by an engagement device of a second embodiment.
Figure 12:
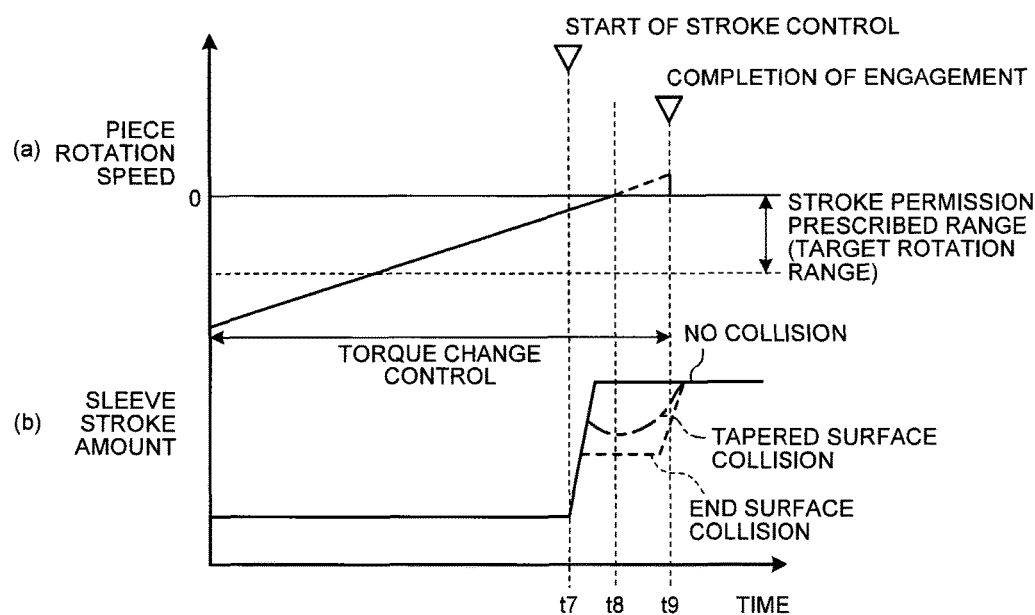
FIG. 12 is a time chart of the engagement control processing performed by the engagement device of the second embodiment.

Next, a second embodiment will be described with reference to FIGS. 11 and 12. FIG. 11 is a flow chart of engagement control processing performed by an engagement device of the second embodiment. FIG. 12 is a time chart of the engagement control processing performed by the engagement device of the second embodiment. The configuration of the time chart of FIG. 12 is the same as the configuration of the time chart of FIG. 4 in the first embodiment.

The second embodiment differs from the first embodiment in that the torque change control is started regardless of whether the stroke condition has been completed. That is, in the second embodiment, the stroke control is started prior to the start of the torque change control.

Description will be made in accordance with the flow chart of FIG. 11. First, it is determined whether the rotation direction of the piece 7 is negative rotation (step S201). When the rotation direction of the piece 7 is not negative rotation as the result of the determination in step S201 (No in step S201), the first motor generator MG1 is controlled to change the rotation speed of the piece 7 to the negative rotation (step S202), and the processing returns to step S201. The processing in step S202 can be performed, for example, by setting a target rotation speed to negative rotation and feedback-controlling the first motor generator MG1.

On the other hand, when the rotation direction of the piece 7 is determined to be negative rotation as the result of the determination in step S201 (Yes in step S201), the first motor generator MG1 is controlled to perform torque change control into the positive rotation direction on the piece 7 (step S203).

In the time chart of FIG. 12, the piece rotation speed is negative rotation from the beginning. Thus, the torque change control is performed from a starting point of the time chart. At the starting point of the time chart, the rotation speed of the piece 7 has a value that is larger in the negative rotation direction than a target rotation range and falls outside the target rotation range. The rotation speed of the piece 7 is gradually changed from the negative rotation direction to the positive rotation direction by the torque change control.

Referring back to FIG. 11, it is determined whether the rotation speed of the piece 7 has transitioned into the predetermined target rotation range by the torque change control in step S203 (step S204). As illustrated in FIG. 12, the target rotation range is a range from zero rotation up to a predetermined negative rotation speed as with the first embodiment. The condition for determining the transition into the target rotation range may include, for example, that the piece rotation speed remains within the target rotation range for a certain time as with the first embodiment.

When the rotation speed of the piece 7 is determined to fall outside the predetermined rotation range (No in step S204), the processing returns to step S201. On the other hand, when the rotation speed of the piece 7 is determined to fall within the predetermined rotation range (Yes in step S204), the stroke control for moving the sleeve 8 in the engaging direction is performed while continuously performing the torque change control (step S205).

In the time chart of FIG. 12, the determination of the transition into the target rotation range in step S204 is performed at time t7 when a predetermined time has passed with a state in which the rotation speed of the piece 7 is maintained within the target rotation range. Then, the stroke control in the engaging direction on the sleeve 8 is started at the time t7, and the stroke amount of the sleeve 8 gradually increases after the time t7. That is, the sleeve 8 approaches the piece 7.

At the point when the stroke control is started, the rotation speed of the piece 7 is within the target rotation range from zero rotation to the predetermined negative rotation speed. Thus, the piece 7 rotates in the negative direction. In an interval up to time t8 when the rotation speed becomes zero, the piece 7 rotates in a direction in which the small tooth surfaces 11a of the piece 7 and the small tooth surfaces 12a of the sleeve 8 approach each other. After the time t8, the rotation speed of the piece 7 becomes a positive rotation speed, and the rotation direction of the piece 7 is inverted into a direction in which the large tooth surfaces 11b of the piece and the large tooth surfaces 12b of the sleeve 8 approach each other.

Referring back to FIG. 11, it is determined whether the engagement between the dog teeth 12 of the sleeve 8 and the dog teeth 11 of the piece 7 has been completed (step S206). When the engagement has not been completed (No in step S206), the processing returns to step S205, and the stroke control is continuously performed. On the other hand, when the engagement has been completed (Yes in step S206), this control flow is finished.

In the time chart of FIG. 12, the piece 7 becomes positive rotation after the time t8 so that the piece 7 rotates in the direction in which the large tooth surfaces 11b of the piece 7 and the large tooth surfaces 12b of the sleeve 8 approach each other, and it is determined at time t9 that the large tooth surfaces 11b of the piece 7 and the large tooth surfaces 12b of the sleeve 8 mesh with each other and the engagement between the sleeve 8 and the piece 7 has been completed.

Also in the present embodiment, the engagement control on the piece 7 and the sleeve 8 is configured in such a manner that the rotation speed of the piece 7 is switched to the positive rotation after the stroke condition for the stroke control described in the first embodiment is completed. That is, the size of the positive torque to be added by the torque change control and the condition for the target rotation range in step S204 (start timing of the stroke control) are set so as to change the rotation speed of the piece 7 from a negative rotation speed to a positive rotation speed after the lapse of a time required for the sleeve 8 to move by a predetermined stroke amount. In the time chart of FIG. 12, it can be determined, at the time t8 when the piece rotation speed is switched from a negative rotation speed to a positive rotation speed, that the time required for the sleeve 8 to move by the predetermined stroke amount has passed and the stroke condition has been completed.

Third Embodiment

Figure 13:
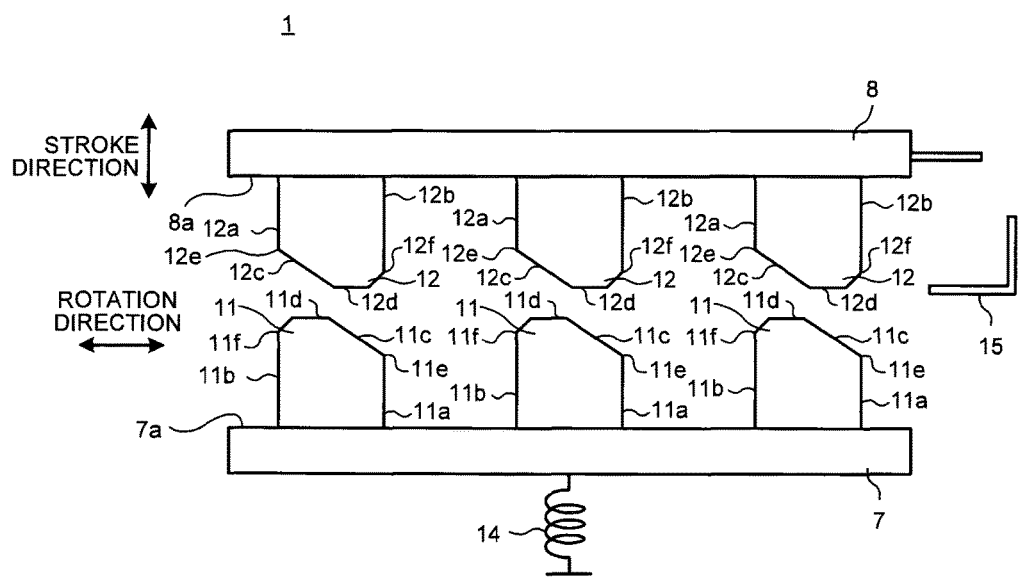
FIG. 13 is a schematic view illustrating an enlarged principal part of an engagement device of a third embodiment of the present invention.

Next, a third embodiment will be described with reference to FIGS. 13 to 18. FIG. 13 is a schematic view illustrating an enlarged principal part of an engagement device of the third embodiment of the present invention.

The engagement device 1 of the third embodiment differs from the first embodiment and the second embodiment in that a spring 14 (biasing unit) which expands and contracts to be biased in the axial direction in response to contact between a piece 7 and a sleeve 8 in the axial direction is connected to the piece 7 as illustrated in FIG. 13.

The spring 14 is connected to the piece 7 expandably and contractably along the axial direction of the rotation shaft 13. The piece 7 is placed movably along the axial direction only within an expansion/contraction range of the spring 14. When the piece 7 and the sleeve 8 come into contact with each other in the axial direction during engagement control, the spring 14 expands or contracts in response to movement in the axial direction of the piece 7 caused by the contact and exhibits a biasing force in a direction opposite to the expansion/contraction direction.

As illustrated in FIG. 13, a stopper 15 is provided for the sleeve 8. The sleeve 8 is restricted from further moving toward the piece 7 by the stopper 15 at a predetermined position in the stroke direction. The placement position of the stopper 15 is set so as to restrict the movement of the sleeve 8 at a position where the dog teeth 12 of the sleeve 8 completely mesh with the dog teeth 11 of the piece 7.

For the convenience of explanation of the present embodiment, a configuration in which the spring 14 is directly connected to the piece 7 as illustrated in FIG. 13 has been described as an example. However, the spring 14 is not necessarily directly connected to the piece 7, but only required to be arranged between the first motor generator MG1 which is a driving source of the piece 7 and the piece 7 as long as the movement in the axial direction of the piece 7 and the application of a biasing force toward the sleeve 8 can be achieved by the contact with the sleeve 8.

The engagement device 1 of the third embodiment is capable of performing both the control flow of the first embodiment illustrated in FIG. 3 and the control flow of the second embodiment illustrated in FIG. 11. However, in the configuration of the present embodiment, the operations of the piece 7 and the sleeve 8 differ from those of the first and second embodiments by the action of the spring 14 when the sleeve 8 collides with the large tapered surfaces 11c or the end surfaces 11d of the piece 7 during the stoke control.

Hereinbelow, the operation of the engagement device 1 according to the third embodiment will be described on the case in which the large tapered surfaces 11c and 12c collide with each other during the stroke control as an example with reference to FIGS. 14 to 18 in accordance with the control flow of the first embodiment illustrated in FIG. 3.

Figure 14:
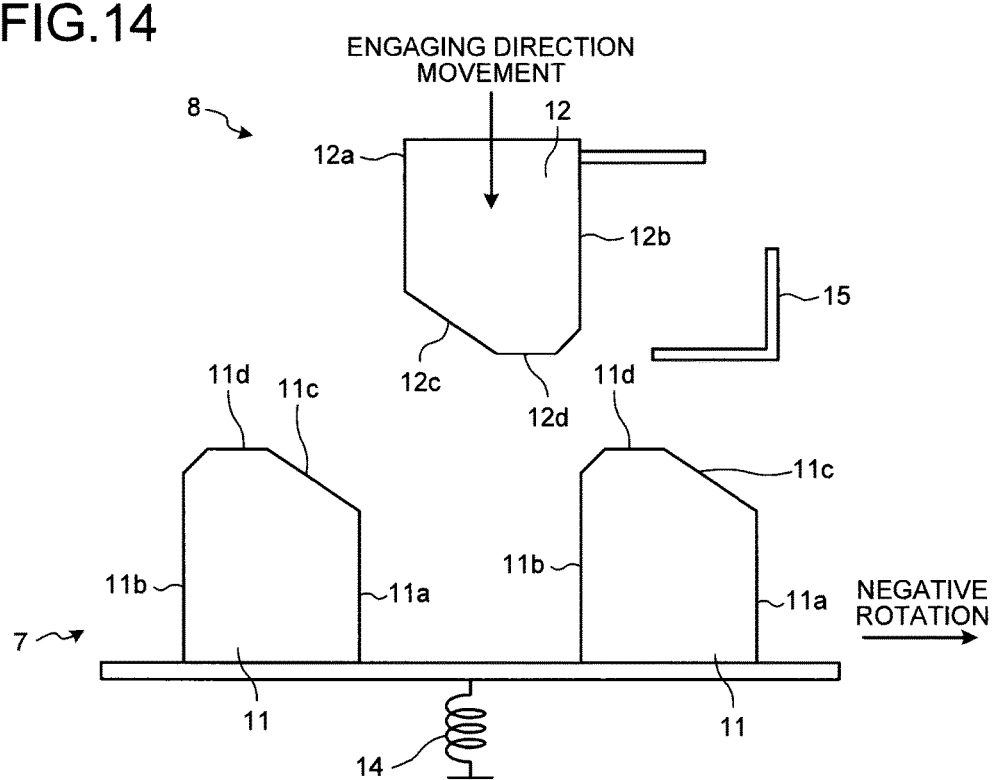
FIG. 14 is a schematic view illustrating a state in which a sleeve approaches a piece in an engagement operation performed by the engagement device of the third embodiment.

In step S104, the stroke control on the sleeve 8 is started with the piece 7 maintaining rotation within a predetermined target rotation range. FIG. 14 is a schematic view illustrating a state in which the sleeve 8 approaches the piece 7 after the start of the stroke control. At this point, as illustrated in FIG. 14, the sleeve 8 moves in the engaging direction by a thrust force and the dog teeth 12 of the sleeve 8 approach the dog teeth 11 of the piece 7 making negative rotation.

In step S105, when it is determined that the stroke condition of the sleeve 8 has not been completed (No in step S105), the processing returns to step S104, and the stroke control is continuously performed.

Figure 15:
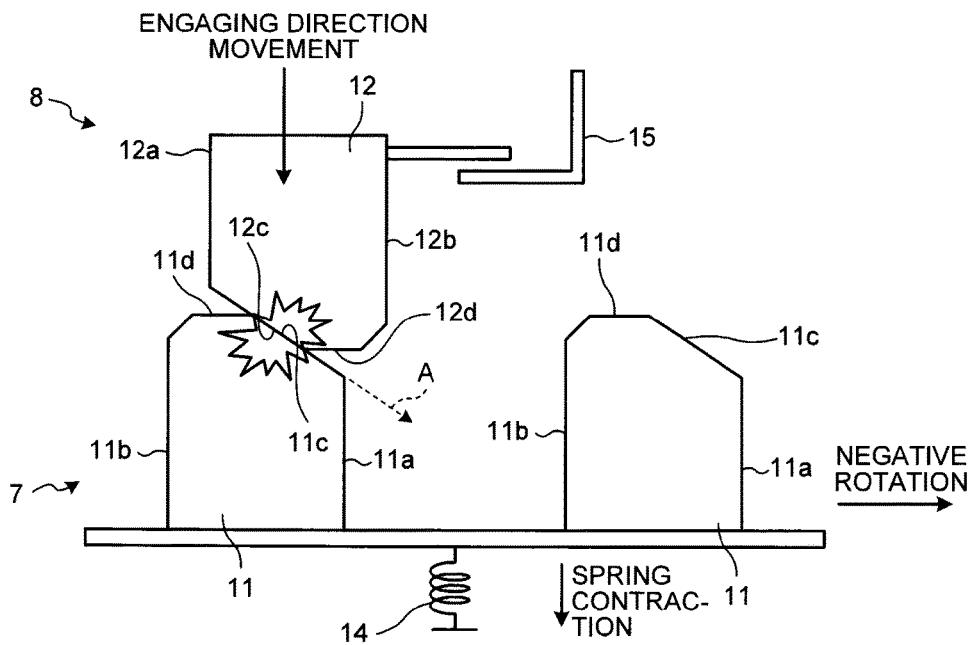
FIG. 15 is a schematic view illustrating a state in which a large tapered surface of the sleeve collides with a large tapered surface of the piece in the engagement operation performed by the engagement device of the third embodiment.

While the stroke control is continuously performed, the piece 7 makes negative rotation and the relative position between the piece 7 and the sleeve 8 transitions in such a manner that the tooth surfaces 11a of the piece 7 and the tooth surfaces 12a of the sleeve 8 approach each other. Thus, the sleeve 8 moves to approach the piece 7 in such a manner that the large tapered surfaces 12c of the sleeve 8 at least partially face the large tapered surfaces 11c of the piece 7. In this example, the sleeve 8 first collides with the large tapered surfaces 11c of the piece 7 on the large tapered surfaces 12c thereof. FIG. 15 is a schematic view illustrating a state in which a large tapered surface 12c of the sleeve 8 collides with a large tapered surface 11c of the piece 7 during the execution of the stroke control. As illustrated in FIG. 15, the large tapered surfaces 12c of the sleeve 8 moving in the engaging direction collide with the large tapered surfaces 11c of the piece 7 making negative rotation during the execution of the stroke control on the sleeve 8.

The collision converts part of the thrust force in the negative rotation direction of the piece 7 into the engaging direction. The piece 7 receives the thrust force in the engaging direction of the sleeve 8 on the large tapered surfaces 11c. These thrust forces in the engaging direction allow the spring 14 to contract, so that the piece 7 moves in a direction separating from the sleeve 8 in the stroke direction (the downward direction in the drawing). The piece 7 moves also in the negative rotation direction. As a result, the piece 7 moves in a direction separating from the sleeve 8 along the large tapered surfaces 12c (the right-lower direction indicated by arrow A in FIG. 15) while making contact with the large tapered surfaces 12c of the sleeve 8.

Figure 16:
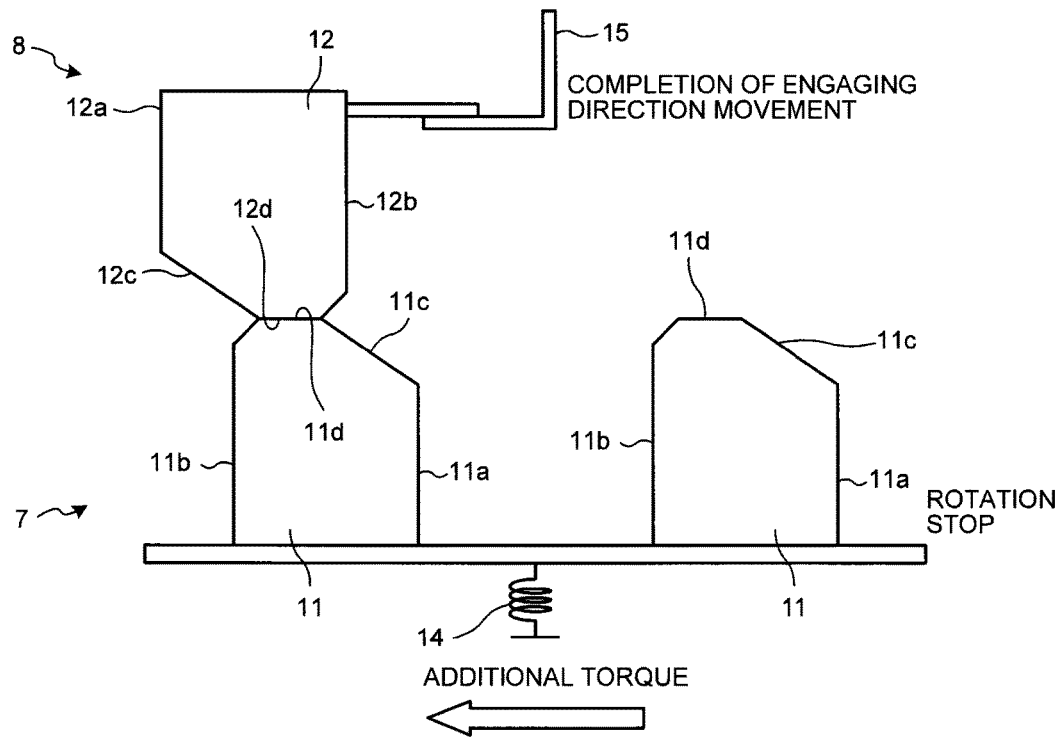
FIG. 16 is a schematic view illustrating a state in which movement control on the sleeve has been completed in the engagement operation performed by the engagement device of the third embodiment.
Figure 17:
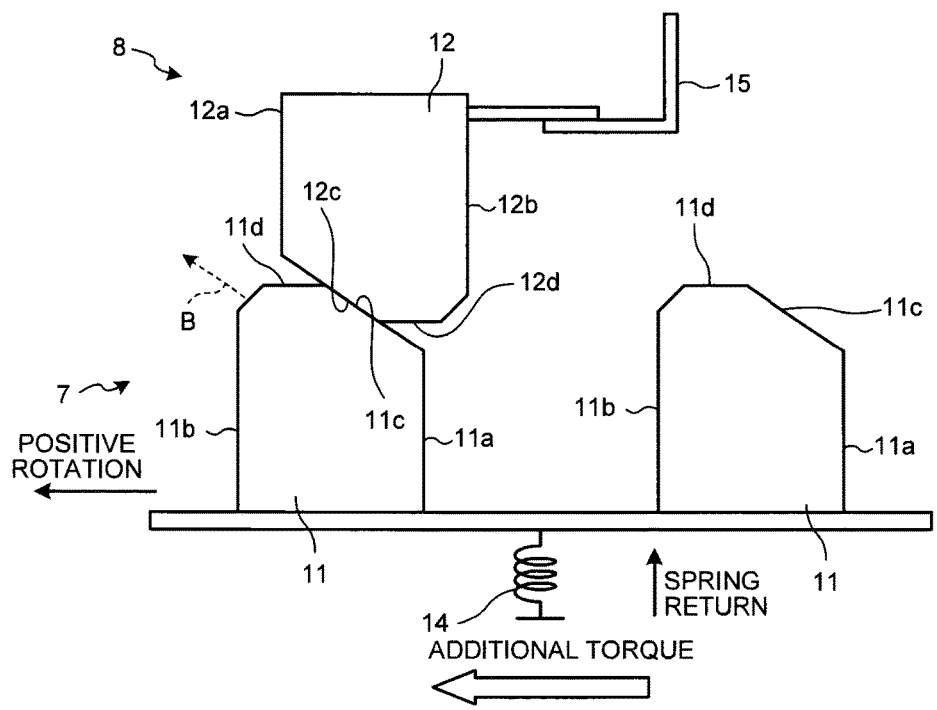
FIG. 17 is a schematic view illustrating a state in which the rotation direction of the piece is inverted by torque change control in the engagement operation performed by the engagement device of the third embodiment.

FIGS. 16 and 17 are schematic views illustrating the positional relationship between the sleeve 8 and the piece 7 during the execution of the torque change control. FIG. 16 illustrates a state in which the negative rotation of the piece 7 is stopped by application of an additional torque. FIG. 17 illustrates a state in which the rotation direction of the piece 7 is inverted into positive rotation by further application of the additional torque.

As illustrated in FIG. 16, when the sleeve 8 reaches a restriction position by the stopper 15 and the stroke control on the sleeve 8 is thereby completed, the torque change control is performed to apply an additional torque in the positive rotation direction to the piece 7. The additional torque stops the rotation of the piece 7 which has been making negative rotation. In the positional relationship between the piece 7 and the sleeve 8 at this point, a contact state between the large tapered surfaces 11c of the piece 7 and the large tapered surfaces 12c of the sleeve 8 is maintained or, as illustrated in FIG. 16, the end surfaces 11d and 12d are in contact with each other after the large tapered surfaces 11c of the piece 7 pass along the large tapered surfaces 12*c* of the sleeve 8. At this point, the spring 14 of the piece 7 contracts to the maximum extent.

Then, as illustrated in FIG. 17, the piece 7 which has stopped rotating starts rotating in an inverted direction, that is, in the positive rotation direction. The movement in the positive rotation direction of the piece 7 allows the large tapered surfaces 11*c* of the piece 7 to again make contact with the large tapered surfaces 12*c* of the sleeve 8. At this point, a biasing force in an opening direction (the upward direction in the drawing) is transmitted to the piece 7 from the spring 14 in a contracted state. However, part of the biasing force is converted into the positive rotation direction by a reaction force received from the large tapered surfaces 12*c* of the sleeve 8 with which the large tapered surfaces 11*c* of the piece 7 are in contact. As a result, the piece 7 moves in a direction approaching to the sleeve 8 (the left-upper direction indicated by arrow B in FIG. 17) along the large tapered surfaces 12*c* of the sleeve 8 while making contact with the large tapered surfaces 12*c*.

When it is determined that the engagement between the dog teeth 12 of the sleeve 8 and the dog teeth 11 of the piece 7 has been completed in step S109 (Yes in step S109), this control flow is finished.

Figure 18:
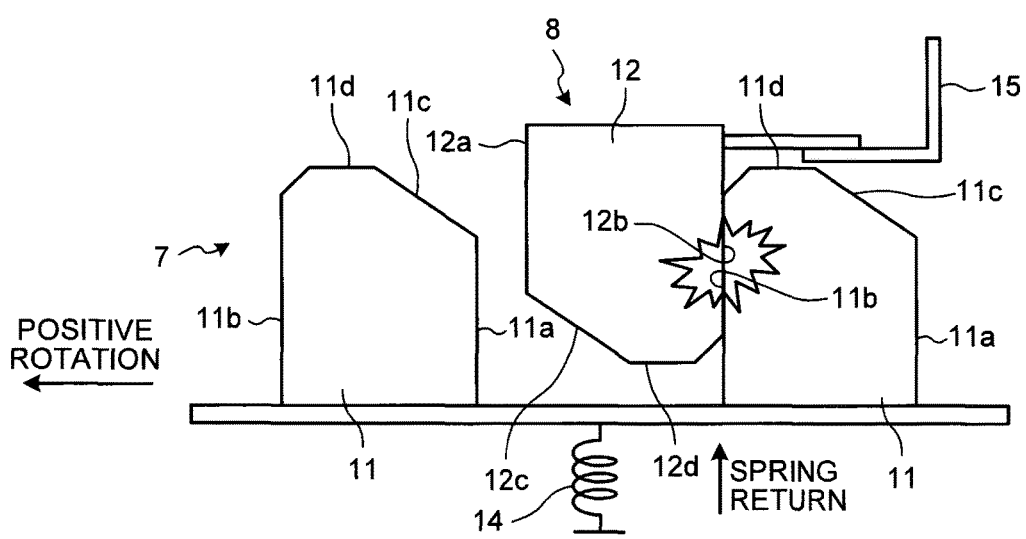
FIG. 18 is a schematic view illustrating a state in which a dog tooth of the sleeve meshes with a dog tooth of the piece in the engagement operation performed by the engagement device of the third embodiment.

FIG. 18 is a schematic view illustrating a state in which a dog tooth 12 of the sleeve 8 meshes with a dog tooth 11 of the piece 7. When the piece 7 moves along the large tapered surfaces 12*c* of the sleeve 8 in the direction of arrow B illustrated in FIG. 17 and then passes the large tapered surfaces 12*c* of the sleeve 8 as illustrated in FIG. 18, the piece 7 is further pushed back toward the sleeve 8 in the stroke direction by a biasing force of the spring 14. Accordingly, the tooth surfaces 12*b* of the sleeve 8 approach the tooth surfaces 11*b* of the piece 7 while increasing a superimposed part between the tooth surfaces 12*b* of the sleeve 8 and the tooth surfaces 11*b* of the piece 7 viewed from the rotation direction. Finally, the tooth surfaces 12*b* of the sleeve 8 and the tooth surfaces 11*b* of the piece 7 collide and mesh with each other with a sufficient meshing area ensured.

The engagement device 1 of the third embodiment is provided with the spring 14 which is biased in the axial direction in response to the contact between the piece 7 and the sleeve 8 in the axial direction and disposed on the piece 7. Thus, it is possible to allow the spring 14 to contract using a pressing force generated when the sleeve 8 collides with the piece 7 and push back the piece 7 toward the sleeve 8 by a biasing force generated by the contraction of the spring 14. Therefore, it is possible to insert the dog teeth 11 of the piece 7 into deeper positions in the spaces between the dog teeth 12 of the sleeve 8. Accordingly, it is possible to further increase the area of the meshing part between the large tooth surfaces 11*b* of the piece 7 and the large tooth surfaces 12*b* of the sleeve 8 and thereby more reliably perform the engagement. Further, since an impact force generated when the sleeve 8 collides with the piece 7 can be absorbed by the spring 14, shock caused in the engagement can be reduced.

Although the configuration in which the spring 14 is disposed on the piece 7 has been described as an example in the third embodiment, the spring 14 may be disposed on the sleeve 8 or springs 14 may be disposed on both the piece 7 and the sleeve 8. The spring 14 may be replaced with another biasing unit that can be biased in response to movement in the axial direction of the piece 7 or the sleeve 8.

The embodiments of the present invention have been described above. However, the above embodiments are presented as examples and have no intension to limit the scope of the invention. The above embodiments can be practiced in other various forms. Various omissions, replacements, and modifications may be made without departing from the gist of the invention. The above embodiments and variations thereof fall within the scope or gist of the invention and also fall within the scope of the invention described in the claims and equivalents thereof.

In the above embodiments, the configuration in which the engagement device 1 according to the present invention is applied to an MG1 lock mechanism which mechanically locks the rotation of the first motor generator MG1 has been described as an example. However, the engagement device 1 according to the present invention may also be applied to an engagement element related to another element in a driving device such as overdrive lock, engine direct shaft gear change, and engine shaft disconnection. The engagement device 1 according to the present invention can also be replaced with a conventional engagement element such as a wet type multiple disc clutch in AT.

In the above embodiments, the configuration in which the dog teeth 11 of the piece 7 and the dog teeth 12 of the sleeve 8 project in their respective directions has been described as an example. However, the positions of the teeth of the piece 7 and the sleeve 8 may have another mode. For example, the teeth of the piece 7 may project outward in the radial direction, and the teeth of the sleeve 8 may project inward from the outer side in the radial direction of the piece 7.

In the above embodiments, the configuration in which the dog teeth 11 of the piece 7 and the dog teeth 12 of the sleeve 8 all have the same length in the axial direction has been described as an example. However, dog teeth having different lengths in the axial direction may be combined. For example, two kinds of dog teeth having long and short lengths in the axial direction may be alternately arranged. In this configuration, teeth having a long axial direction length are likely to first come into contact with each other during the engagement control. Thus, at least the teeth having a long axial direction length may have a shape having the small tooth surfaces 11*a*, 12*a* and the large tooth surfaces 11*b*, 12*b* as with the dog teeth 11, 12 of the above embodiments.

In the above embodiments, the configuration in which the piece 7 rotates and the sleeve 8 linearly moves in one direction has been described as an example. However, another mode may be employed as long as the relative positional relationship in the rotation direction and the stroke direction can be changed between the piece 7 and the sleeve 8. For example, either the piece 7 or the sleeve 8 may be movable in both the rotation direction and the stroke direction, or the piece 7 may move in the stroke direction and the sleeve 8 may move in the rotation direction in an opposite way to the above embodiments.

In the above embodiments, the configuration in which the large tapered surfaces 11*c* are formed on the dog teeth 11 of the piece 7 and the large tapered surfaces 12*c* are formed the dog teeth 12 of the sleeve 8 has been described as an example. However, any connection surfaces which connect the small tooth surfaces 11*a*, 12*a* to the end surfaces 11*d*, 12*d* and have a shape other than a tapered shape such as a convex curved shape, a concave curved shape, and a step shape may be employed.

In the above embodiment, the torque change control for changing the driving torque of the piece 7 is performed in view of responsiveness and controllability when the rotation of the piece 7 is inverted from negative rotation to positive rotation during the engagement control. Instead of this, the target rotation speed in the rotation speed control may be changed to positive rotation.

In the above embodiments, as the actuator 9 for stroke-controlling the sleeve 8, the actuator 9 having a ratchet function for idling by receiving a reaction force has been described as an example. However, an actuator which does not have a ratchet function may be employed.

REFERENCE SIGNS LIST

1 engagement device
6 ECU (control unit)
MG1 first motor generator (rotation unit)
7 piece (first member)
8 sleeve (second member)
9 actuator (movement unit)
11 dog tooth of piece (engaged tooth)
12 dog tooth of sleeve (engaging tooth)
11a, 12a small tooth surface (first tooth surface)
11b, 12b large tooth surface (second tooth surface)
11e, 12e front edge end of small tooth surface
11f, 12f front edge end of large tooth surface
11c large tapered surface (engaged tooth side connection surface)
12c large tapered surface (engaging tooth side connection surface)
13 rotation shaft
14 spring (biasing unit)

The invention claimed is:

1. An engagement device comprising:
a first member including a plurality of engaged teeth;
a second member arranged coaxially with the first member, the second member including a plurality of engaging teeth;
a rotation unit configured to relatively rotate the first member and the second member about an axis;
a movement unit configured to relatively move the first member and the second member in an axial direction; and
a control unit configured to control operations of the rotation unit and the movement unit, wherein
the engaged teeth are formed on the first member at a side opposing the second member along a circumferential direction around the axis, and the engaging teeth are formed on the second member at a side opposing the first member along the circumferential direction around the axis,
each of the engaged teeth includes a pair of tooth surfaces opposing each other in the circumferential direction, and each of the engaging teeth includes a pair of tooth surfaces facing each other in the circumferential direction,
when viewed from the second member, out of the pair of tooth surfaces of each of the engaged teeth, a front edge end of a first tooth surface is arranged on a back side in the axial direction with respect to a front edge end of a second tooth surface, and, when viewed from the first member, out of the pair of tooth surfaces of each of the engaging teeth, a front edge end of a first tooth surface is arranged on a back side in the axial direction with respect to a front edge end of a second tooth surface,
the engaged teeth and the engaging teeth are formed to have a small width in the circumferential direction on a side opposing each other in the axial direction,
the first tooth surfaces of the engaged teeth and the first tooth surfaces of the engaging teeth are arranged to face and approach each other at a time the first member rotates in a negative rotation direction relative to the second member,
the second tooth surfaces of the engaged teeth and the second tooth surfaces of the engaging teeth are arranged to face and approach each other at a time the first member rotates in a positive rotation direction relative to the second member,
at a time the first member and the second member are engaged with each other, the control unit is configured to control the movement unit to relatively move the first member and the second member in a direction approaching each other while the first member is rotating in the negative rotation direction relative to the second member, and further control the rotation unit to change a relative rotation speed of the first member relative to the second member from a negative rotation speed to zero or more after a predetermined movement condition for relative movement between the first member and the second member is satisfied, and
the control unit is configured to control the rotation unit to reduce the relative rotation speed at a time the relative rotation speed becomes a predetermined value in the positive rotation direction or more after the relative rotation speed is changed from a negative rotation speed to zero or more.

2. The engagement device according to claim 1, wherein the control unit is configured to determine that the movement condition is satisfied at a time the control unit has determined that the first member and the second member can approach each other by a predetermined distance.

3. The engagement device according to claim 1, wherein the control unit is configured to control the movement unit to further relatively move the first member and the second member in the direction approaching each other while changing the relative rotation speed from a negative rotation speed to zero or more.

4. The engagement device according to claim 1, comprising a biasing unit provided in at least either the first member or the second member, the biasing unit being biased in response to contact between the first member and the second member in the axial direction.

5. The engagement device according to claim 1, wherein
each of the engaged teeth of the first member includes an end surface arranged to face the second member at a position closest to the second member in the axial direction and an engaged tooth side connection surface connecting the end surface to the first tooth surface of each of the engaged teeth, and
each of the engaging teeth of the second member includes an end surface arranged to face the first member at a position closest to the first member in the axial direction and an engaging tooth side connection surface connecting the end surface to the first tooth surface of each of the engaging teeth.

6. The engagement device according to claim 5, wherein the engaged tooth side connection surface and the engaging tooth side connection surface are surfaces having a tapered shape.

7. The engagement device according to claim 1, wherein
the first member is rotatably supported about a rotation shaft,
the second member is movably supported along the axial direction,
the rotation unit rotates the first member about the axis,
the movement unit moves the second member in the axial direction, and
at a time the first member and the second member are engaged with each other, the control unit is configured to control the movement unit to move the second member in a direction approaching the first member while the first member is rotating in the negative rotation direction and further controls the rotation unit to change the rotation speed of the first member from a negative rotation speed to zero or more after the movement condition is satisfied.

* * * * *